(12) United States Patent
Okamoto et al.

(10) Patent No.: US 11,464,083 B2
(45) Date of Patent: Oct. 4, 2022

(54) ELECTRIC CABLE, CONDUCTOR, HEATING ELEMENT, METHOD FOR PRODUCING CONDUCTOR AND HEATING ELEMENT, AND HEATING DEVICE USING HEATING ELEMENT

(71) Applicants: JIKAN TECHNO, Inc., Hyogo (JP); S.K.G. Co., Ltd., Aichi (JP); Takahiro Kinoshita, Hyogo (JP)

(72) Inventors: Kazuya Okamoto, Hyogo (JP); Takahiro Kinoshita, Hyogo (JP)

(73) Assignees: JIKAN TECHNO, INC., Hyogo (JP); S.K.G. CO., LTD., Aichi (JP); Takahiro Kinoshita, Hyogo (JP)

( * ) Notice: Subject to any disclaimer, the term of this patent is extended or adjusted under 35 U.S.C. 154(b) by 679 days.

(21) Appl. No.: 16/426,605

(22) Filed: May 30, 2019

(65) Prior Publication Data
US 2020/0068663 A1 Feb. 27, 2020

(30) Foreign Application Priority Data

Aug. 23, 2018 (JP) .............................. JP2018-156737
Sep. 26, 2018 (JP) .............................. JP2018-179781

(51) Int. Cl.
| | |
|---|---|
| *H05B 3/56* | (2006.01) |
| *C04B 35/628* | (2006.01) |
| *D01D 5/00* | (2006.01) |
| *D01F 9/12* | (2006.01) |
| *C04B 35/524* | (2006.01) |

(Continued)

(52) U.S. Cl.
CPC ............. *H05B 3/56* (2013.01); *C04B 35/524* (2013.01); *C04B 35/62218* (2013.01); *C04B 35/62272* (2013.01); *C04B 35/62863* (2013.01); *C04B 35/65* (2013.01); *C08K 3/041* (2017.05); *C08K 3/042* (2017.05); *D01D 1/02* (2013.01); *D01D 5/00* (2013.01); *D01F 9/12* (2013.01); *H05B 3/145* (2013.01); *C04B 2235/3826* (2013.01); *C04B 2235/5248* (2013.01); *C08K 2201/001* (2013.01); *C08K 2201/011* (2013.01); *C08K 2201/014* (2013.01)

(58) Field of Classification Search
CPC .................................. H05B 3/58; H05B 3/145
See application file for complete search history.

(56) References Cited

U.S. PATENT DOCUMENTS

| | | | | |
|---|---|---|---|---|
| 4,117,057 A | * | 9/1978 | Yajima .................. | C04B 35/571 528/37 |
| 2003/0180034 A1 | * | 9/2003 | Saito ..................... | H05B 3/145 392/407 |
| 2011/0155153 A1 | * | 6/2011 | Thorens ................. | H05B 3/58 131/329 |

FOREIGN PATENT DOCUMENTS

| | | | | |
|---|---|---|---|---|
| JP | H03101087 A | * | 4/1991 | ............. C04B 35/56 |
| JP | 2009-242180 A | | 10/2009 | |

(Continued)

*Primary Examiner* — Khanh T Nguyen
(74) *Attorney, Agent, or Firm* — Greenblum & Bernstein, P.L.C.

(57) ABSTRACT

A heating element is used, a periphery of the heating element is covered with a net-shaped conductor, the conductor and a carbon fiber bundle are electrically connected with a connecting tool at one end of the heating element, a periphery of the conductor is covered with an outer skin having flexibility, thermal conductivity and an insulating property, and the other end of the heating element is provided with a power supply terminal configured to supply power.

5 Claims, 33 Drawing Sheets

(51) Int. Cl.
    *C04B 35/65*         (2006.01)
    *C04B 35/622*      (2006.01)
    *C08K 3/04*         (2006.01)
    *H05B 3/14*         (2006.01)
    *D01D 1/02*         (2006.01)

(56) References Cited

FOREIGN PATENT DOCUMENTS

| | | |
|---|---|---|
| JP | 2010-042935 A | 2/2010 |
| JP | 2010-262912 A | 11/2010 |
| WO | 2013/058382 | 4/2013 |

\* cited by examiner

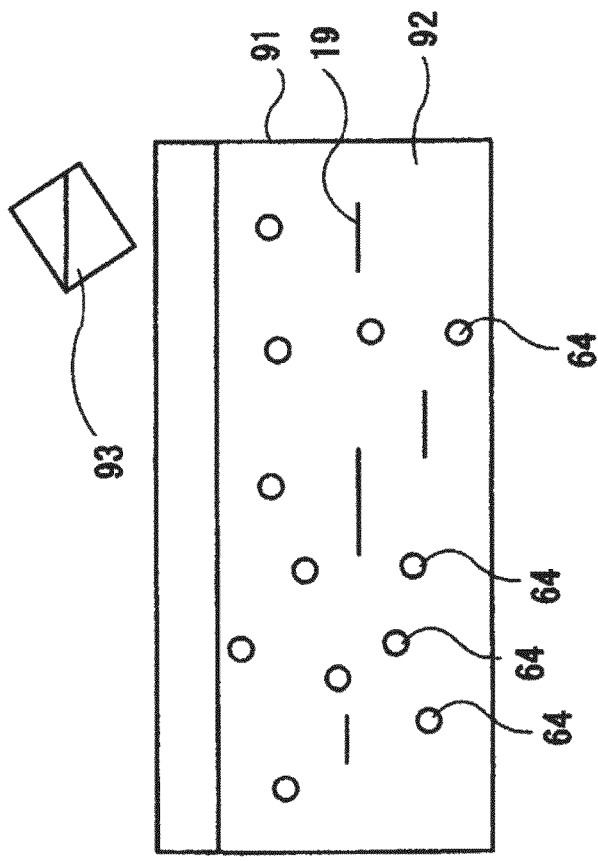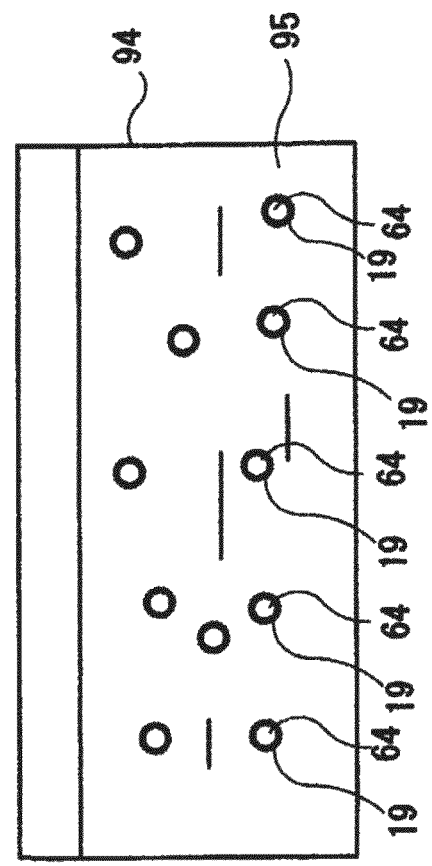
FIG. 11 (A)
FIG. 11 (B)

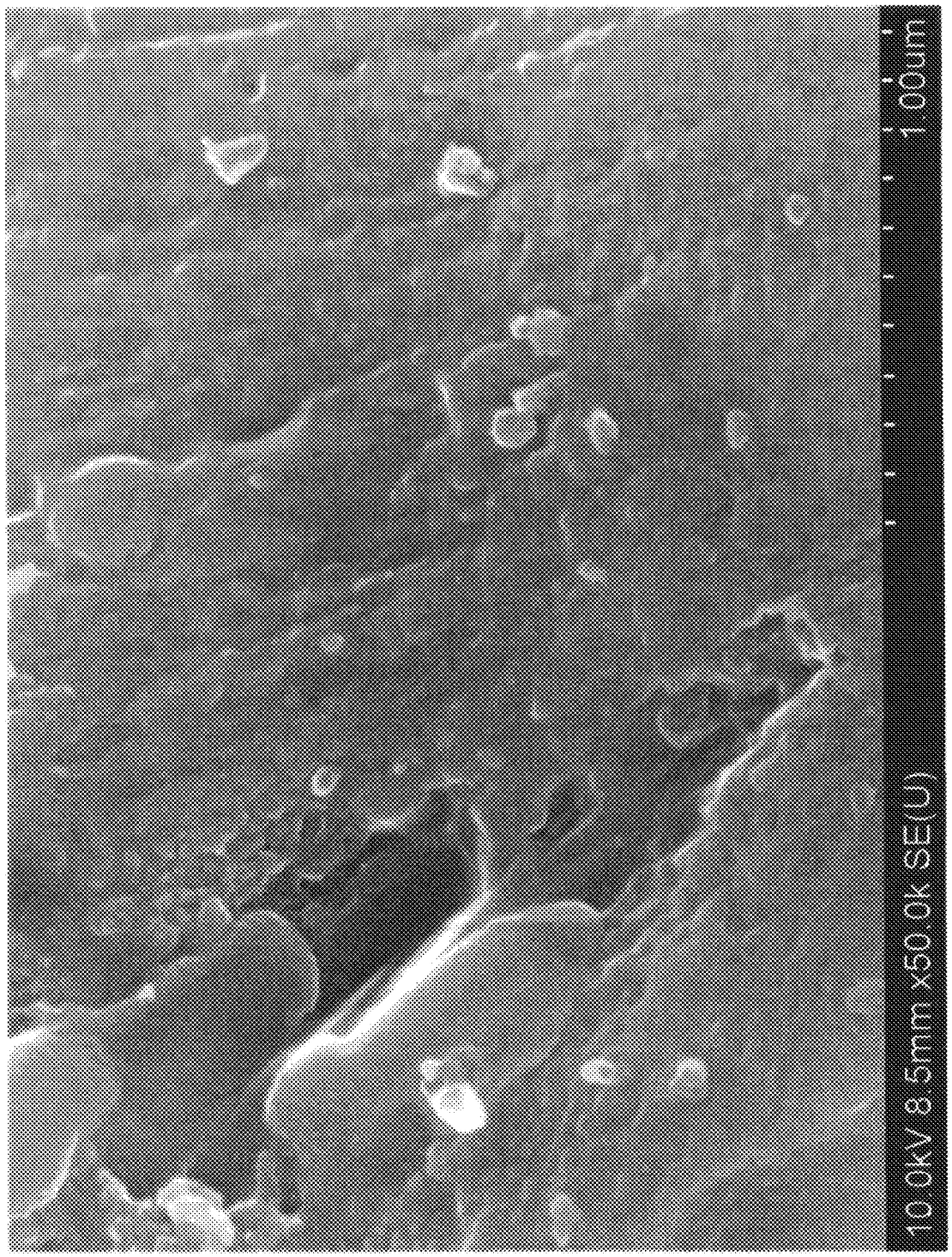
[FIG. 12]

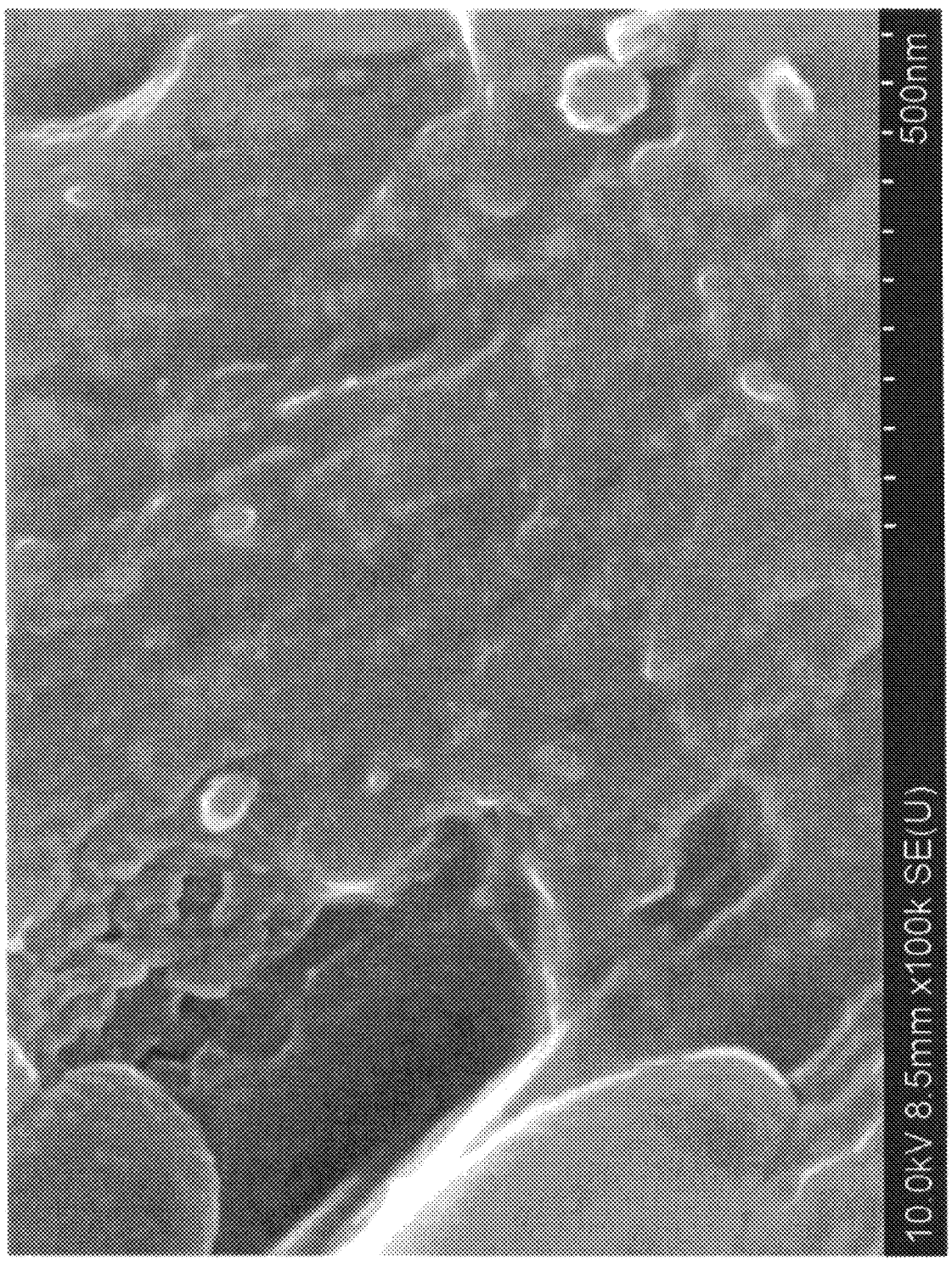
[FIG. 13]

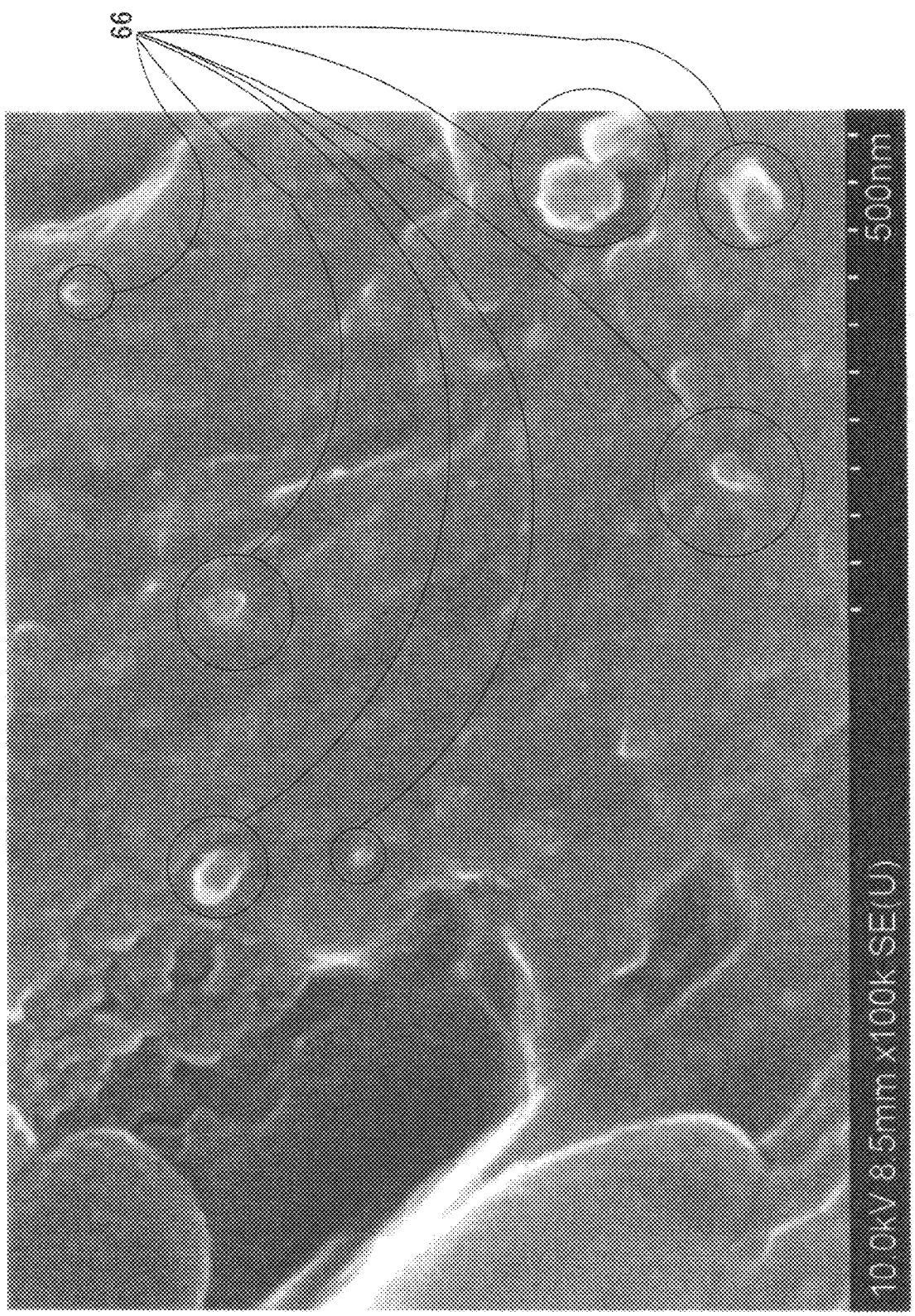
[FIG. 14]

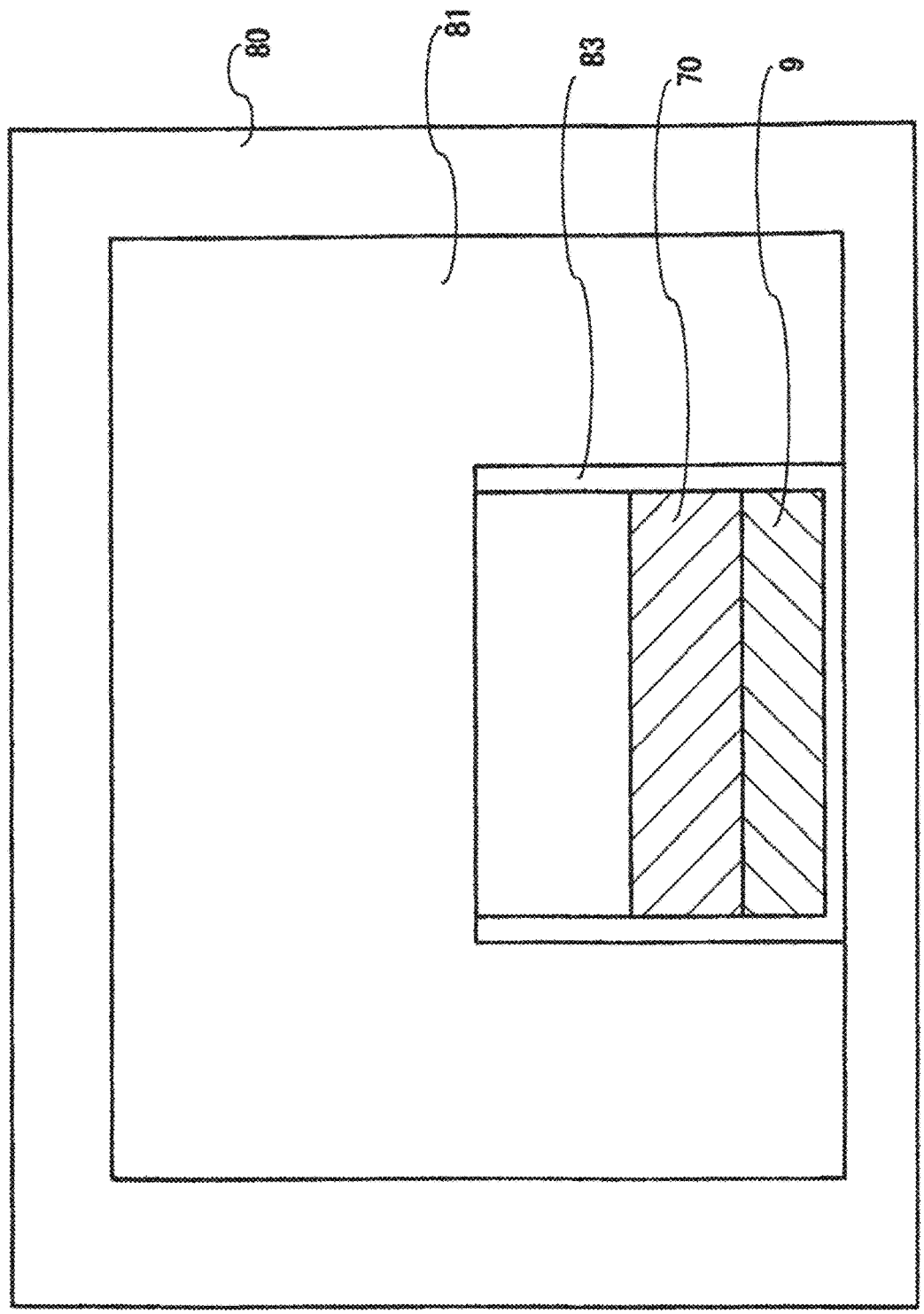
[FIG. 15]

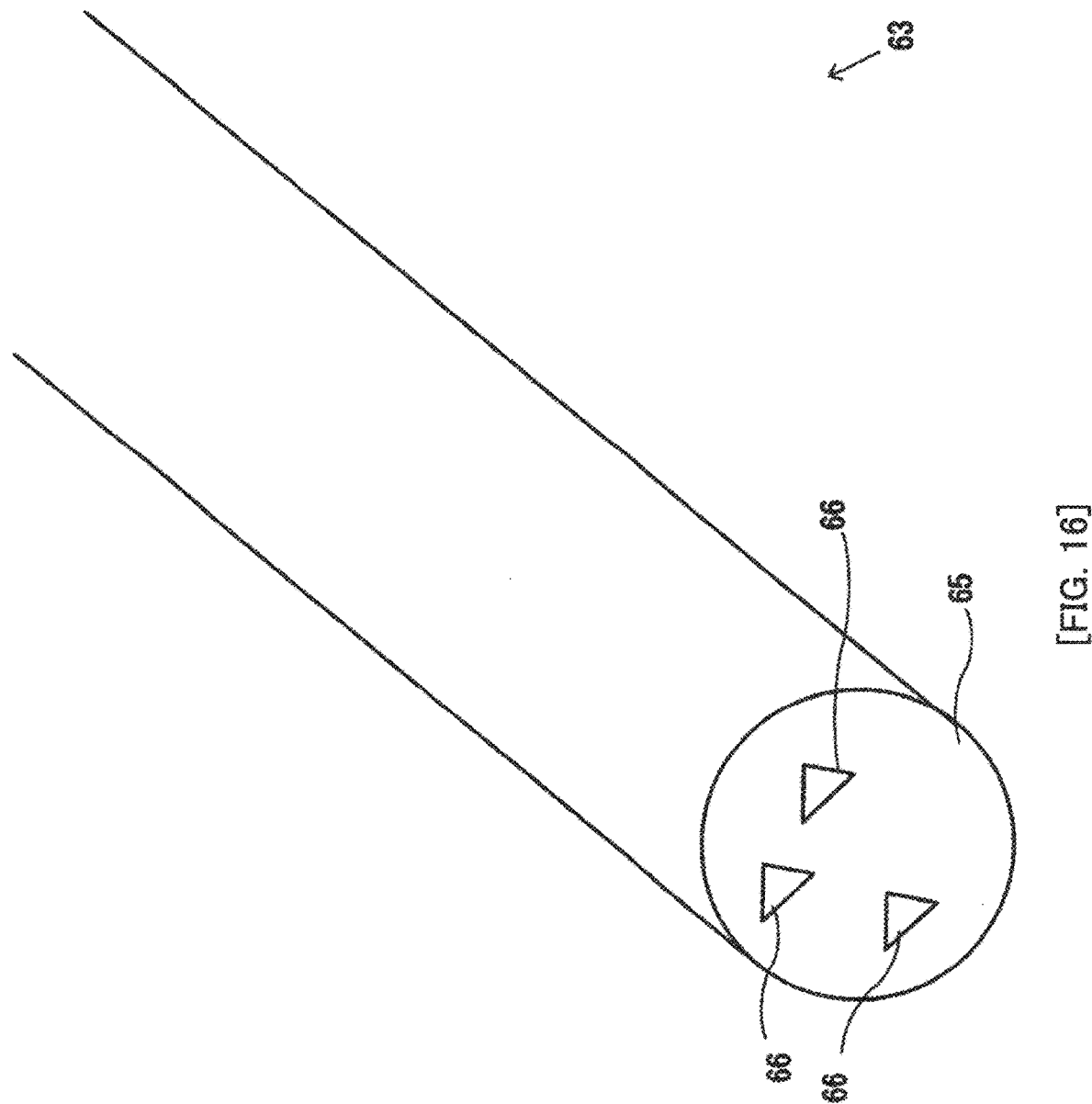

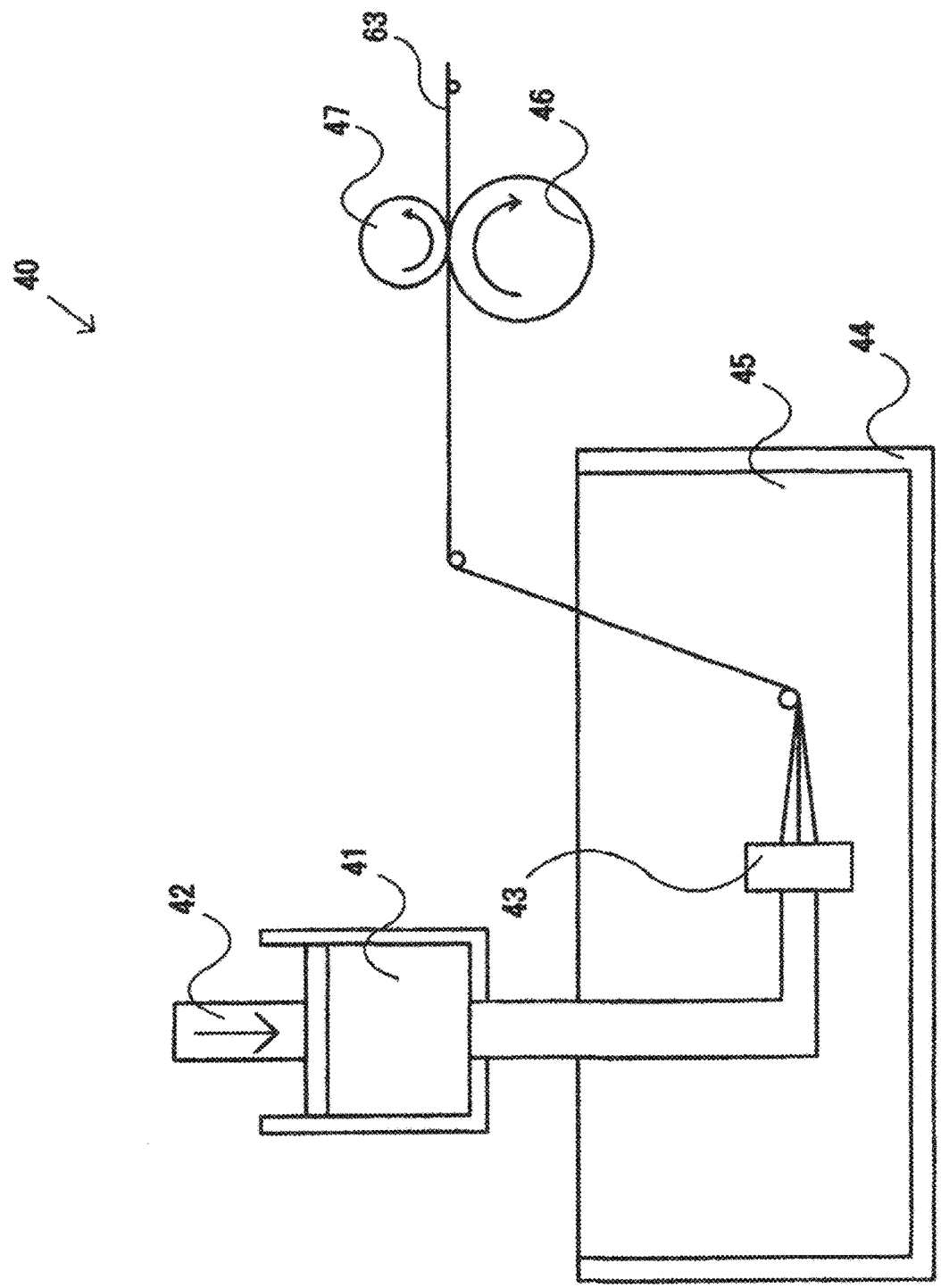
[FIG. 17]

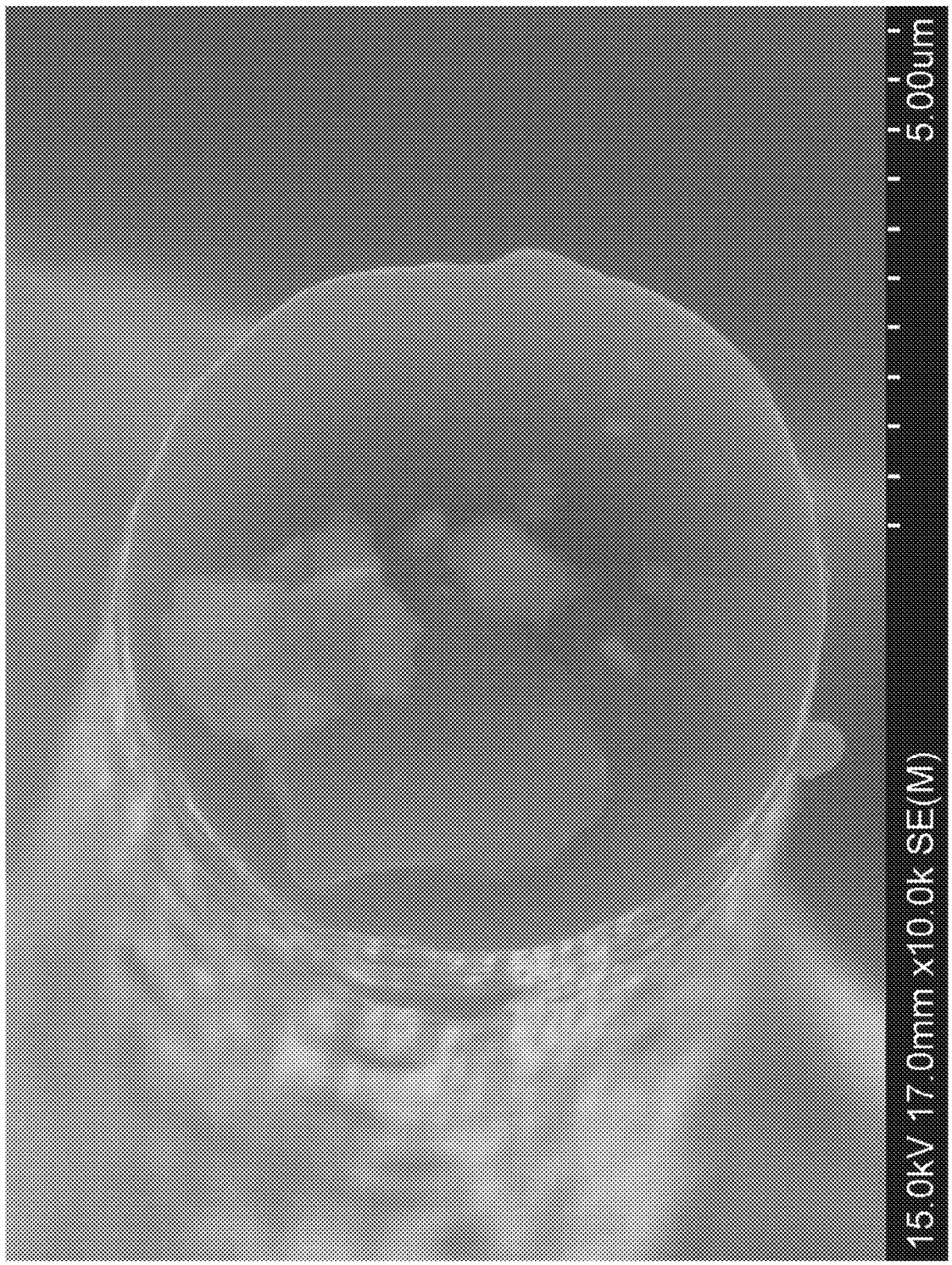
[FIG. 18]

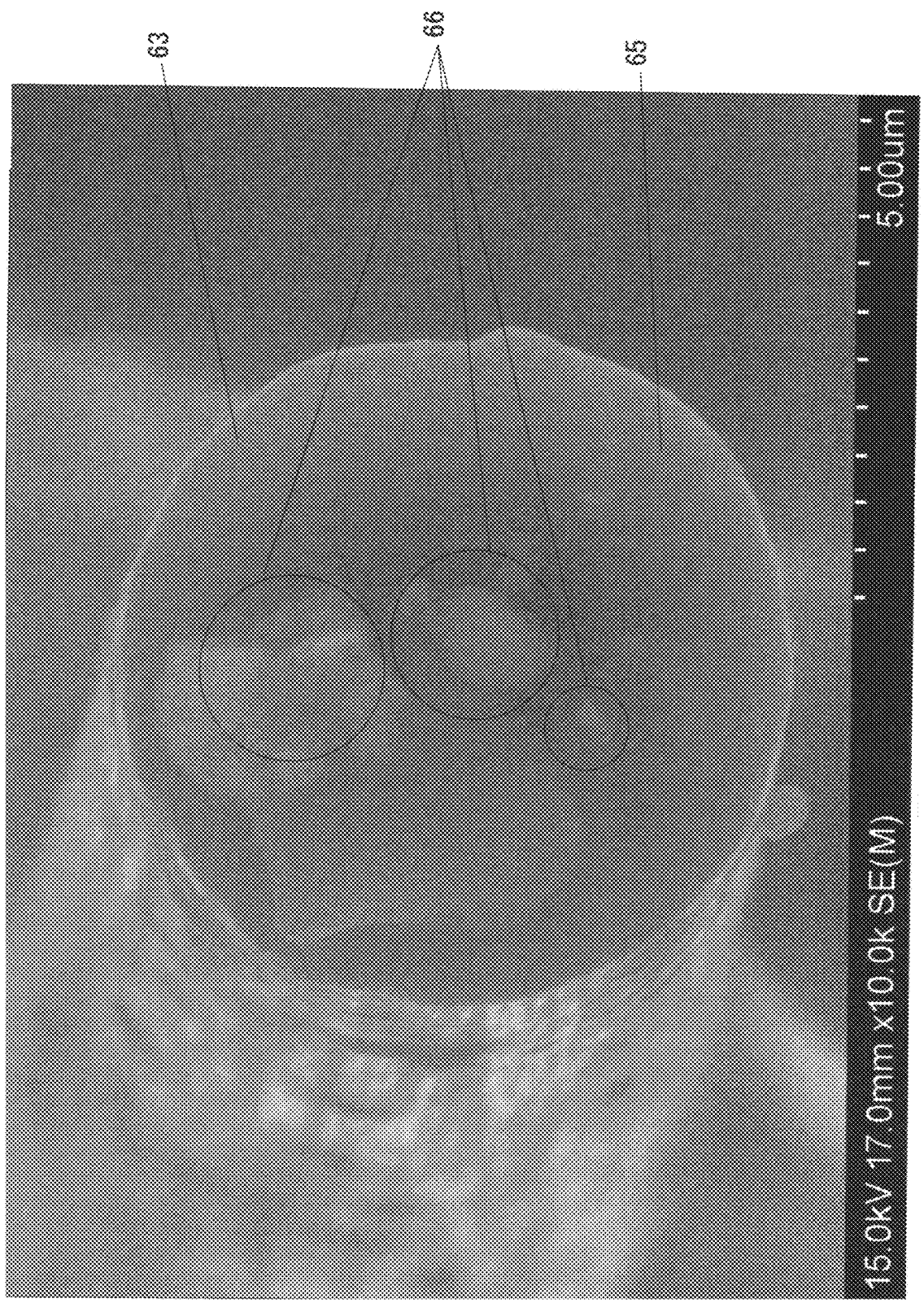
[FIG. 19]

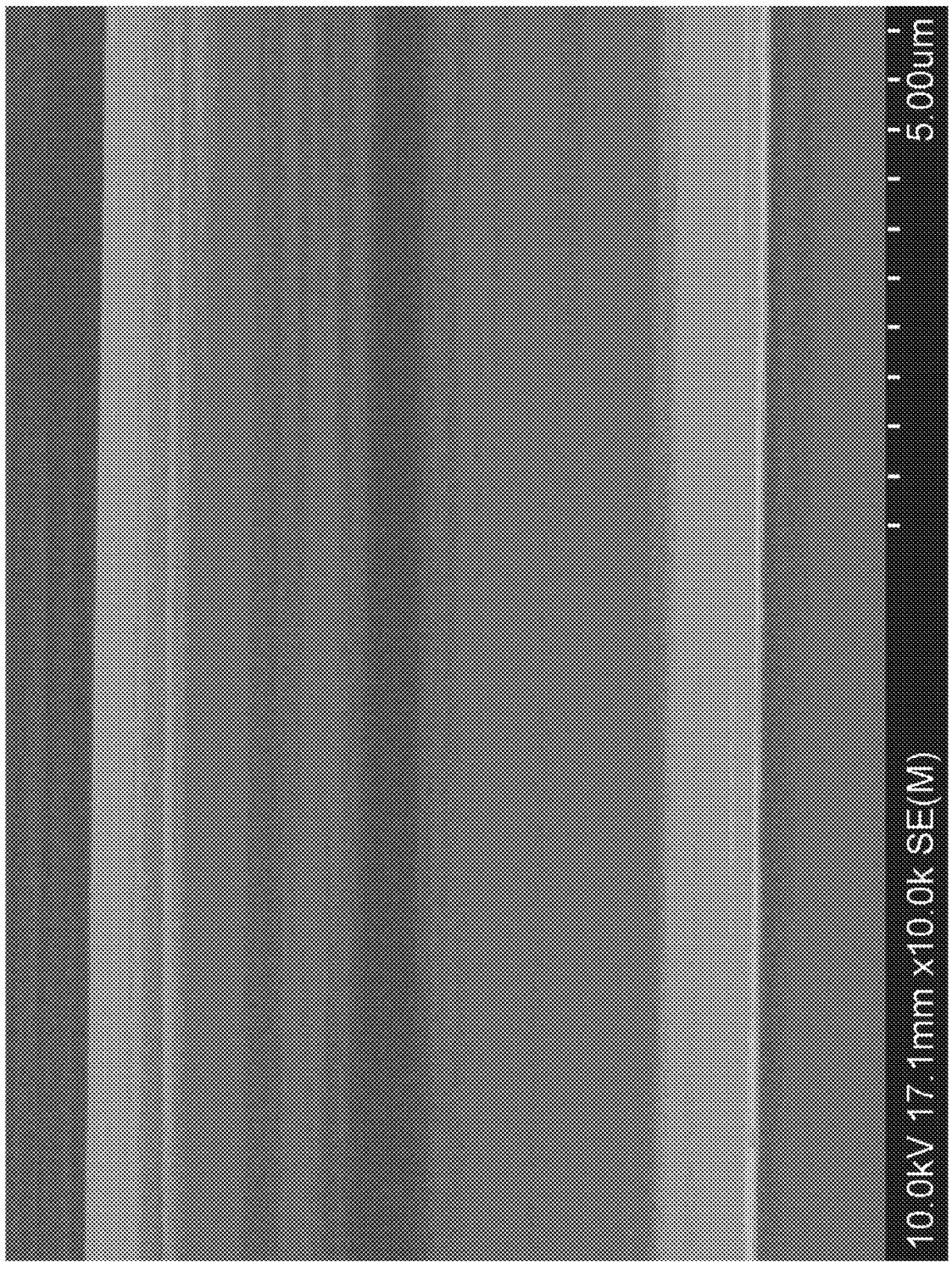
[FIG. 20]

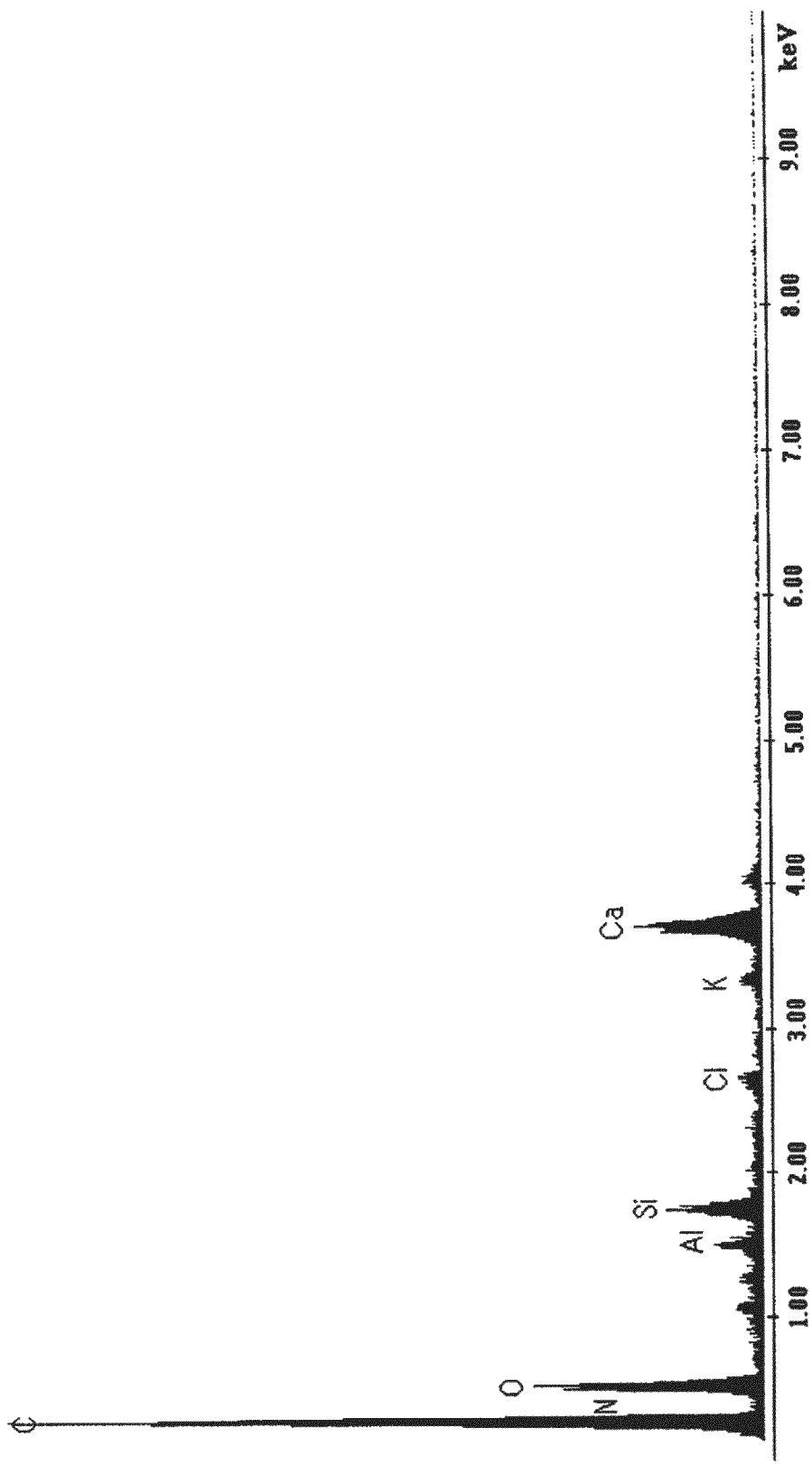
[FIG. 21]

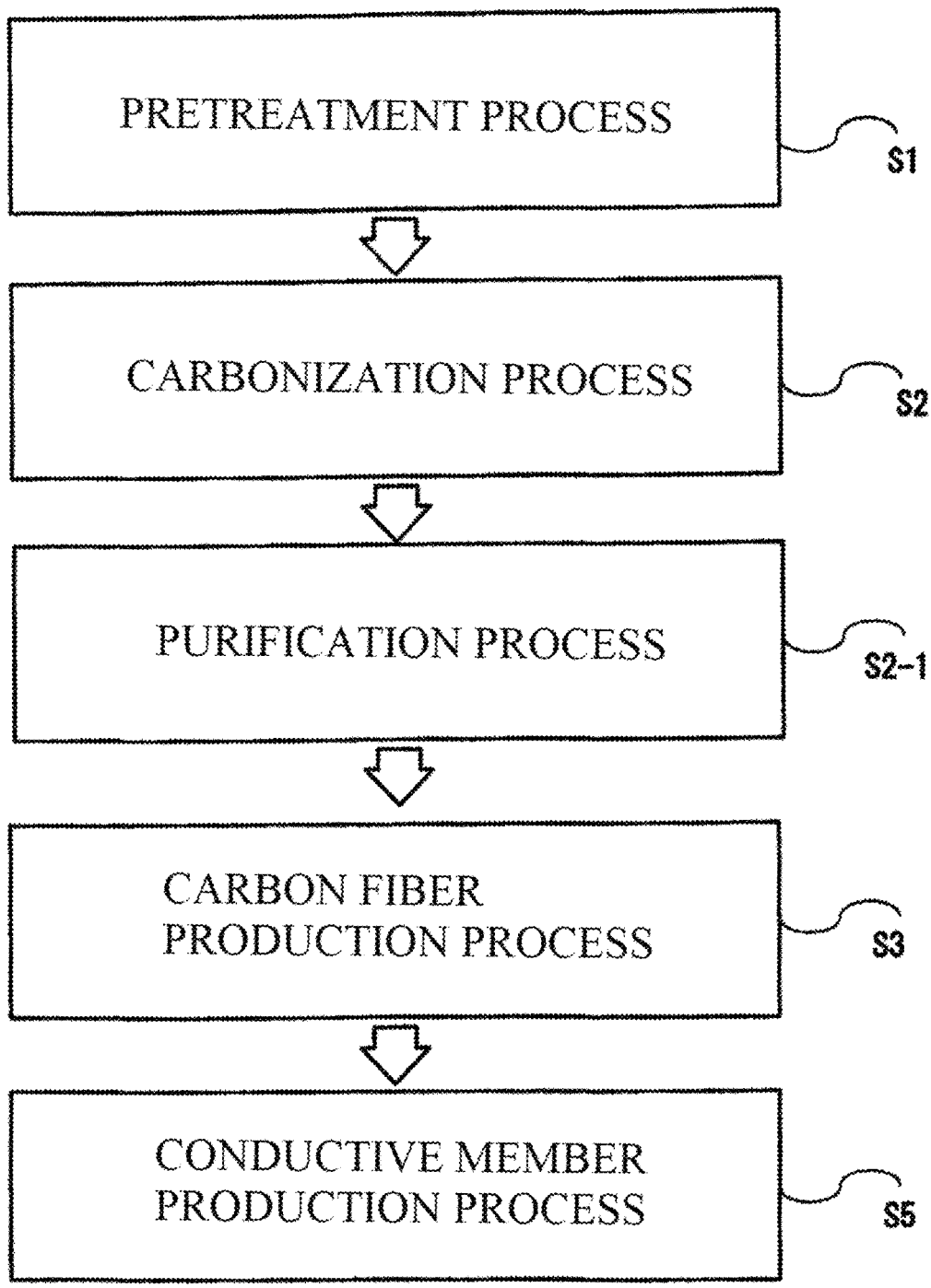
[FIG. 22]

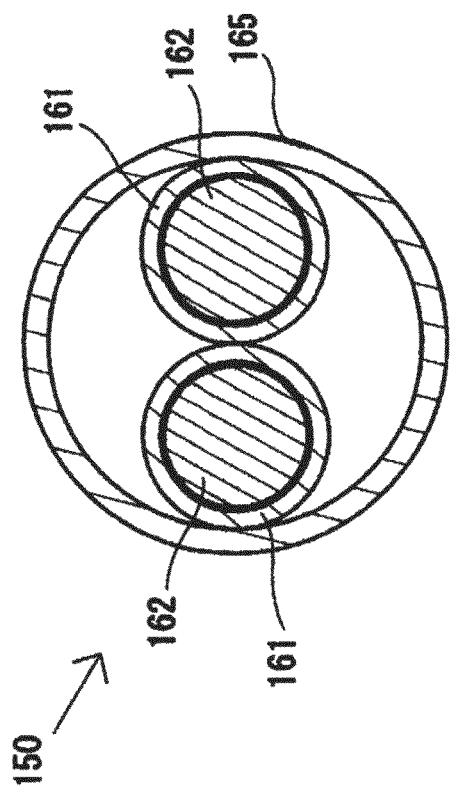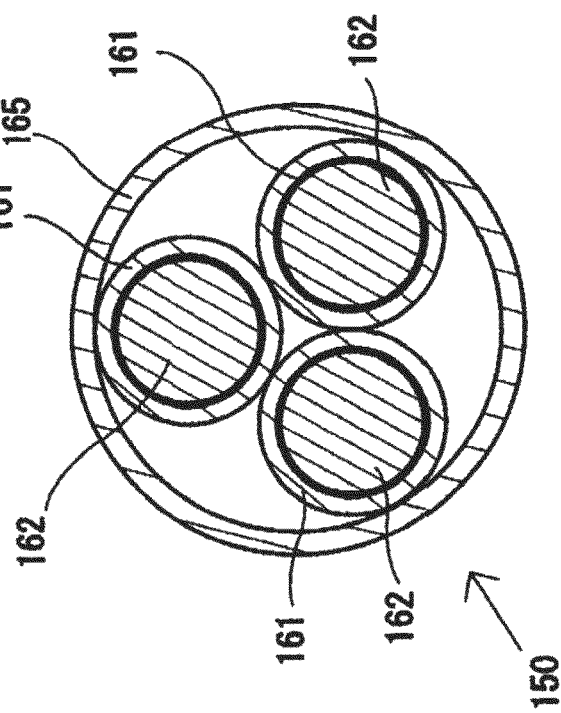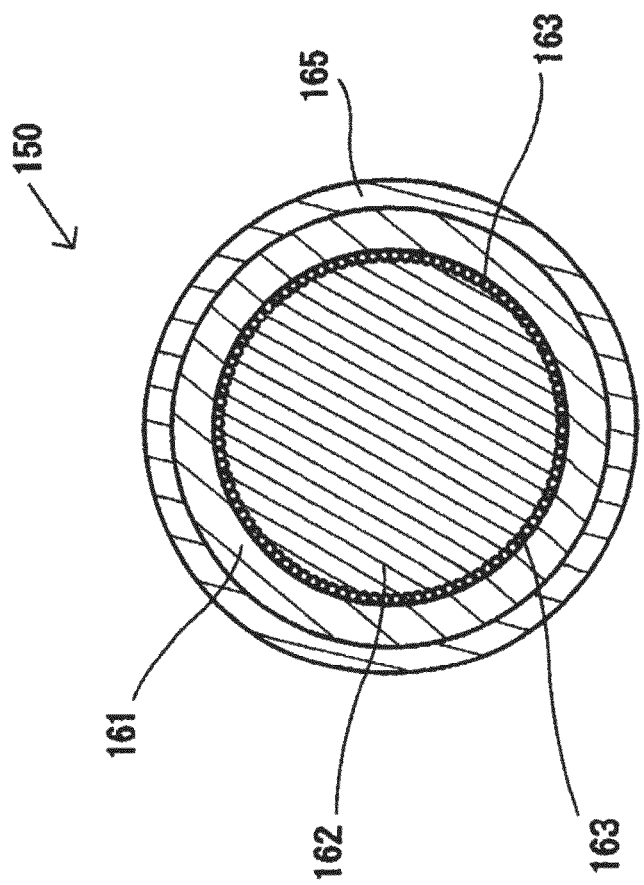

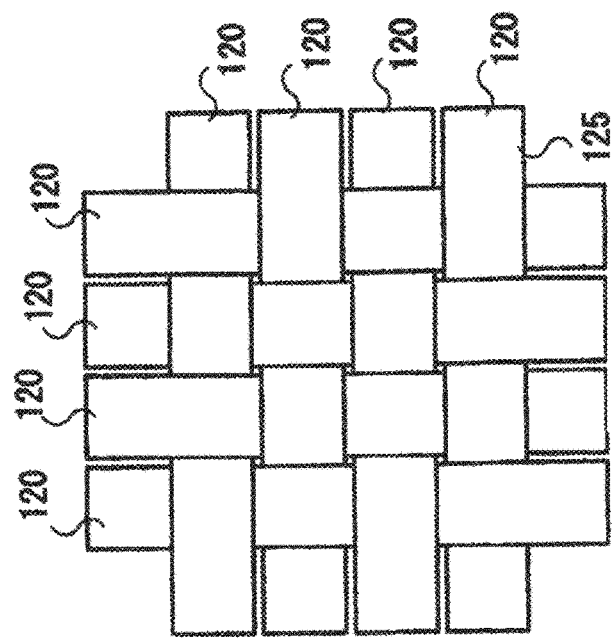
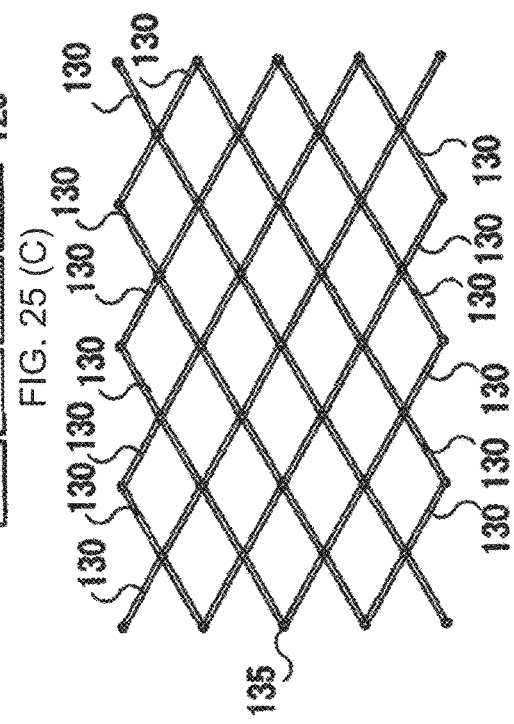
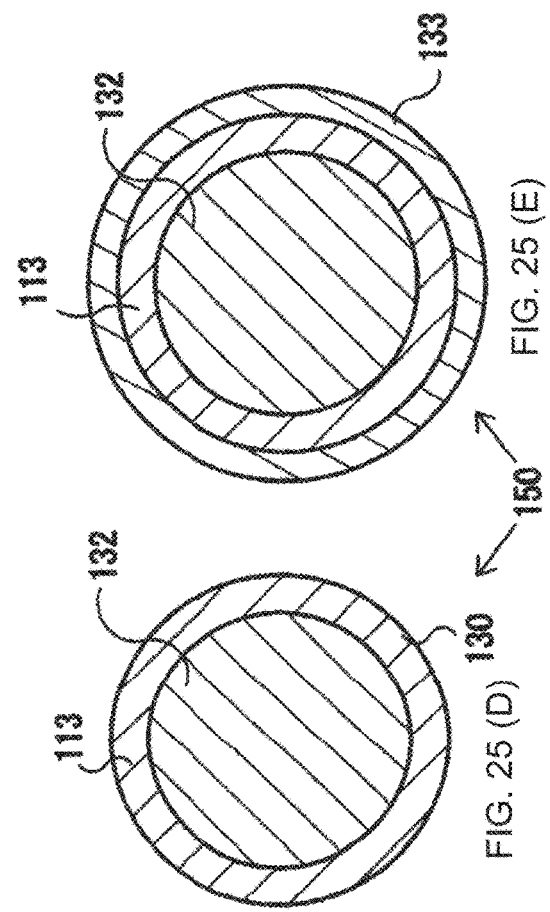

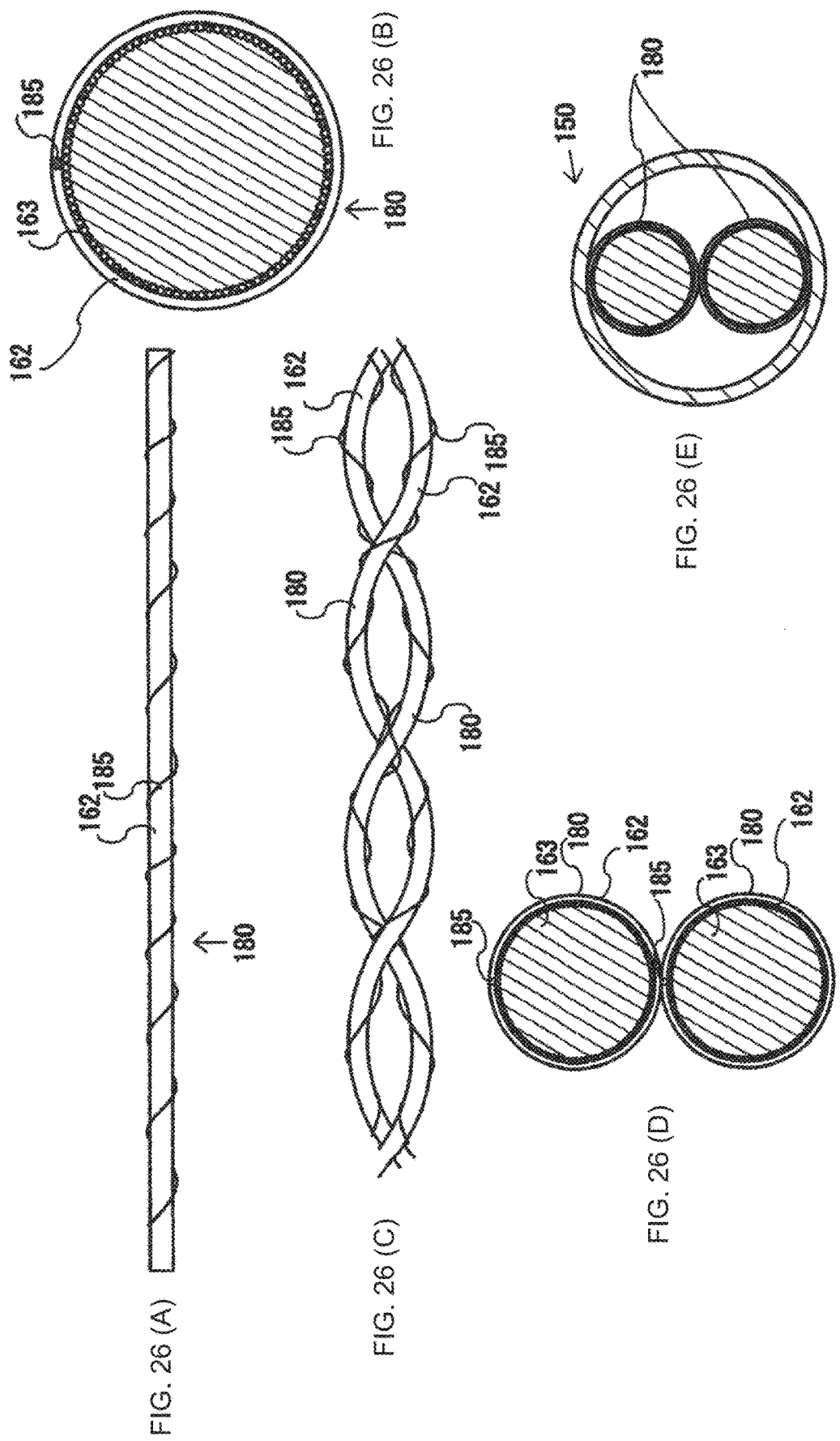

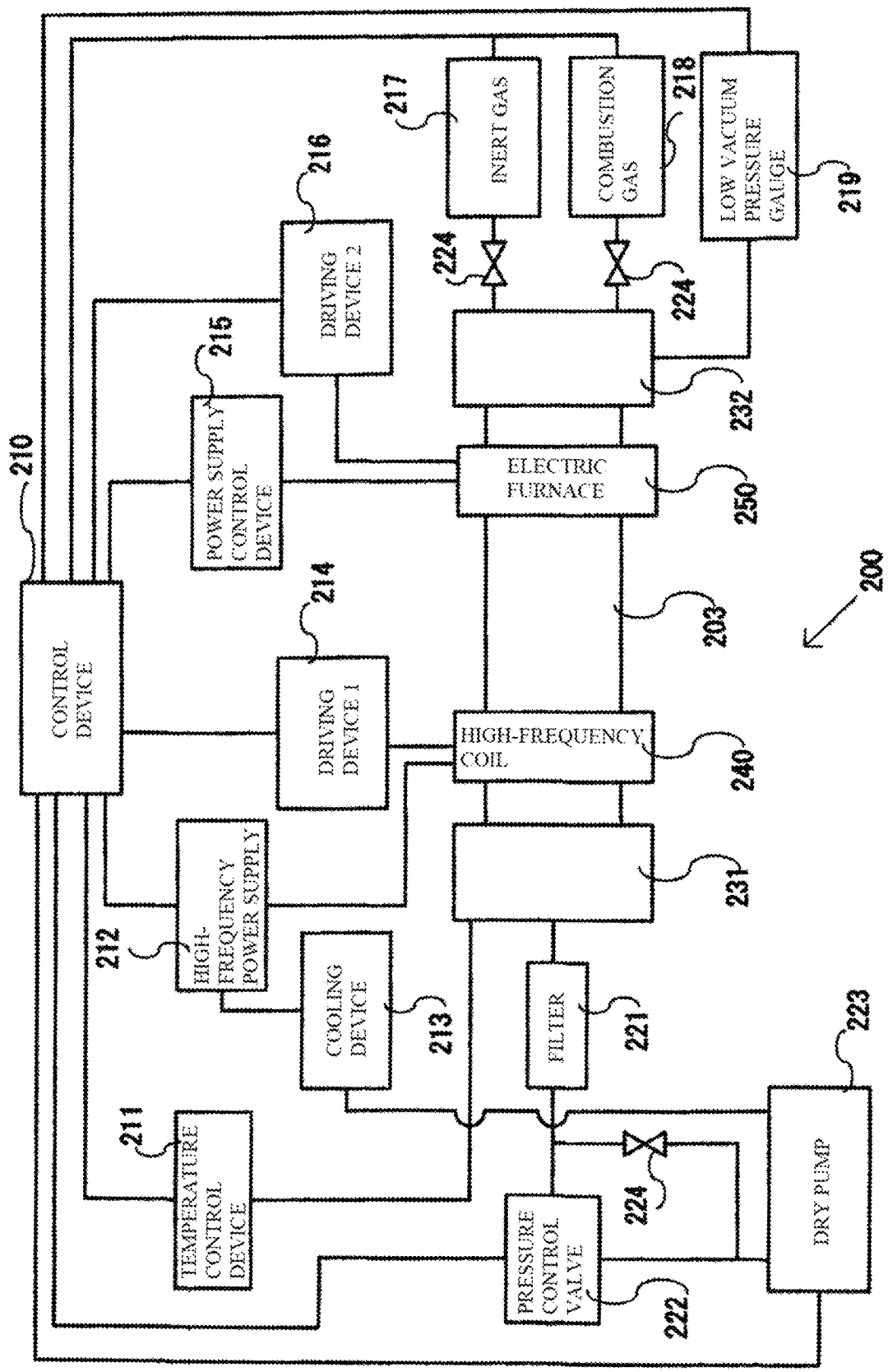
[FIG. 27]

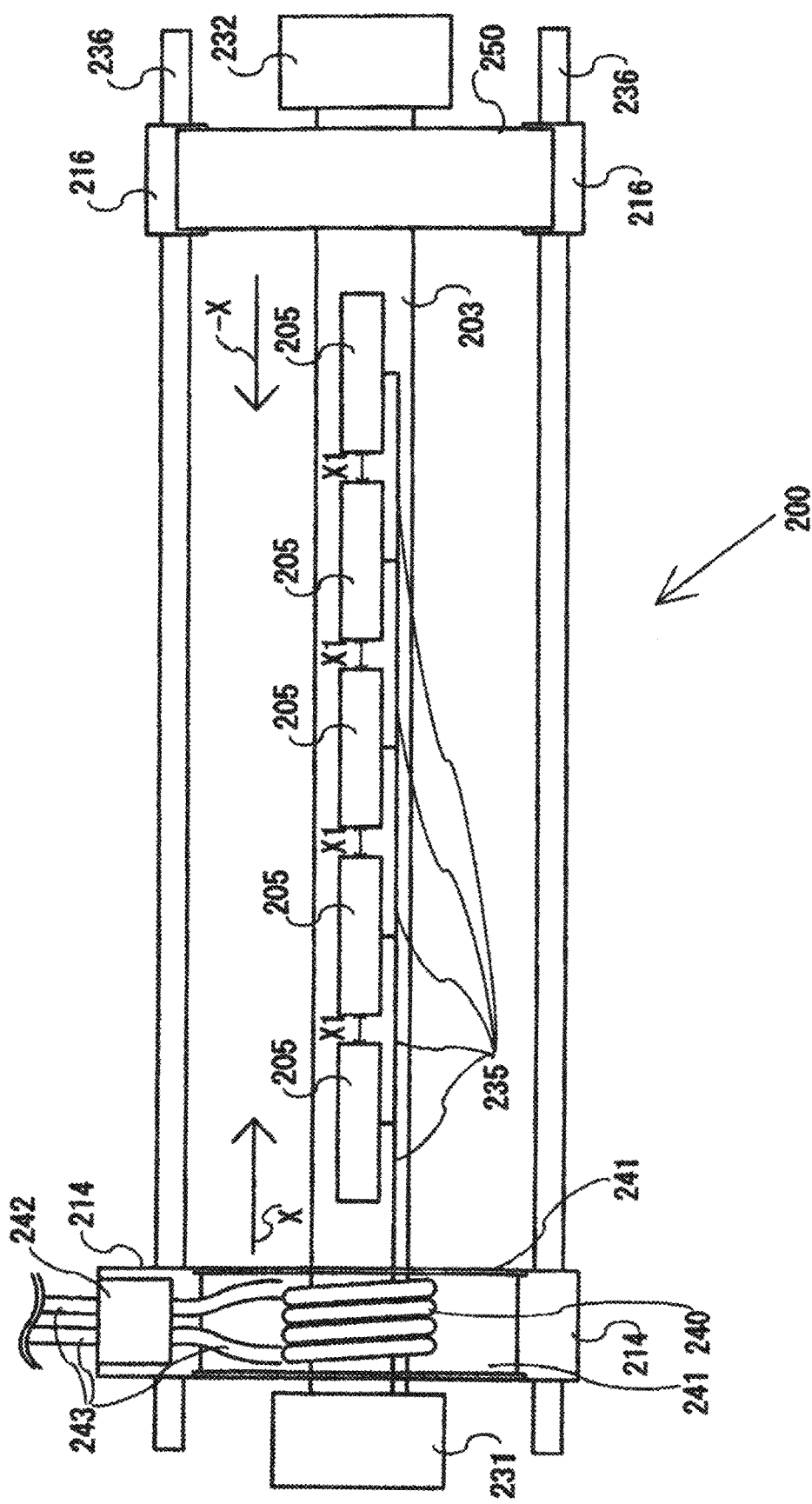
[FIG. 28]

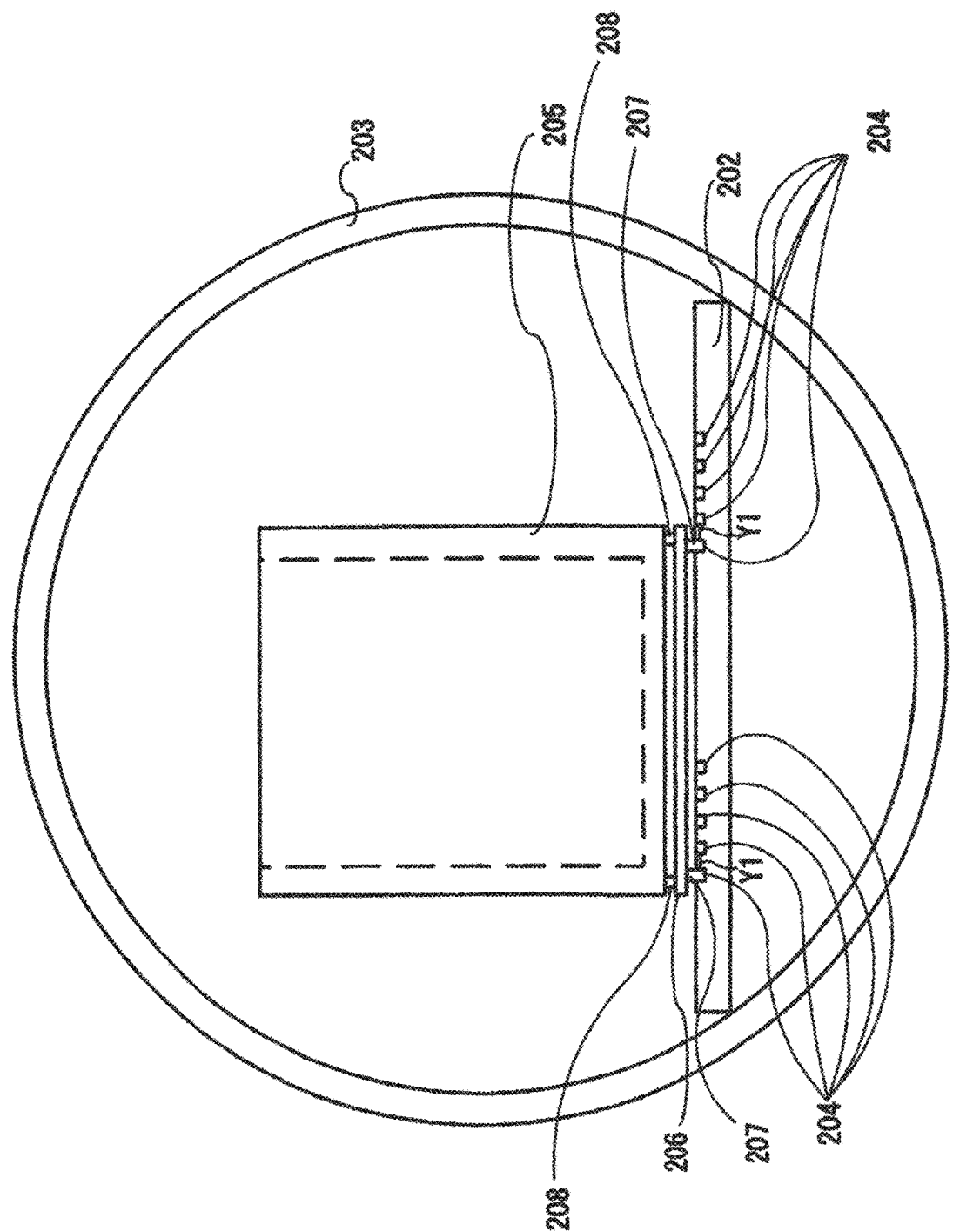
[FIG. 29]

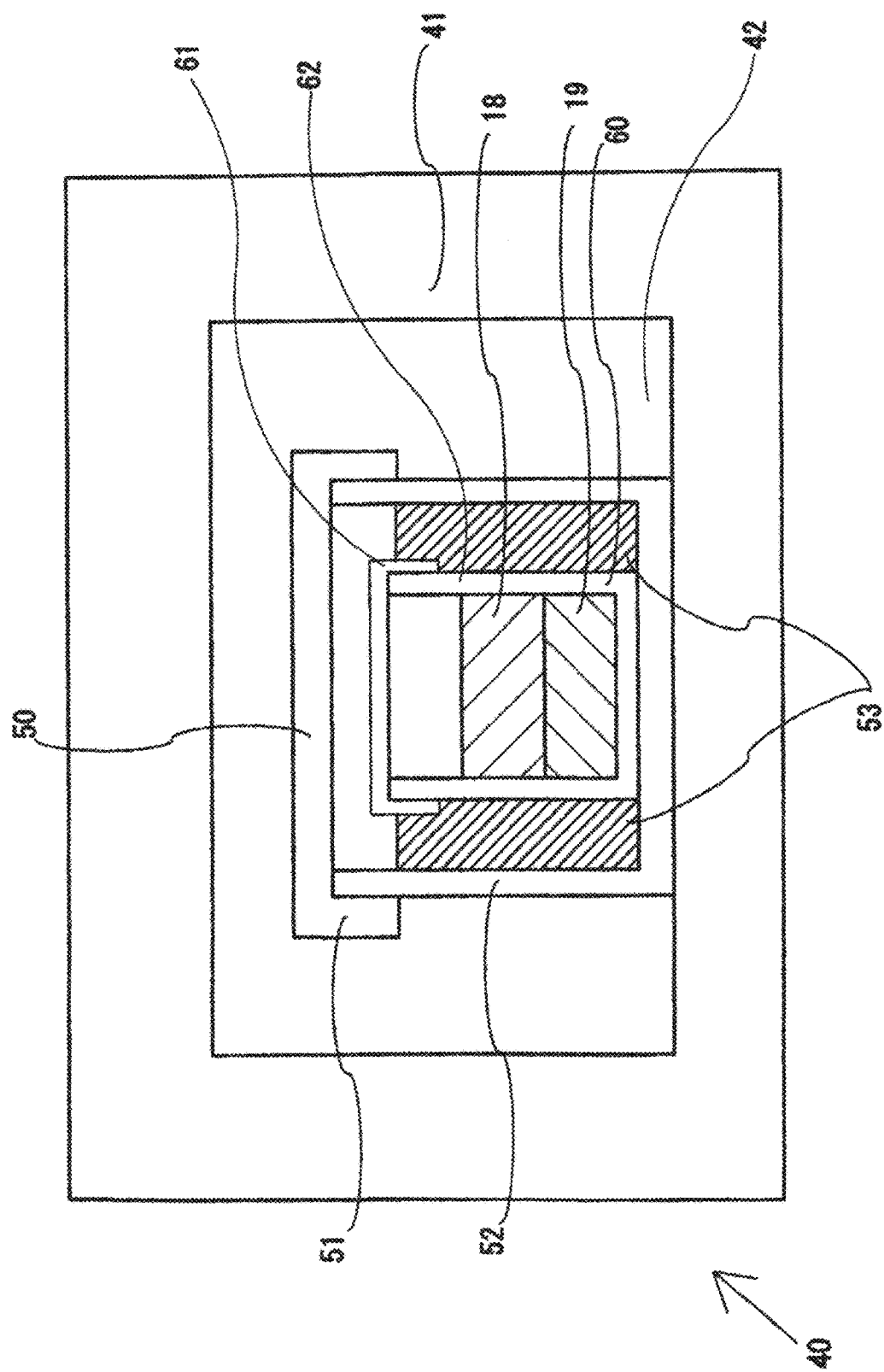

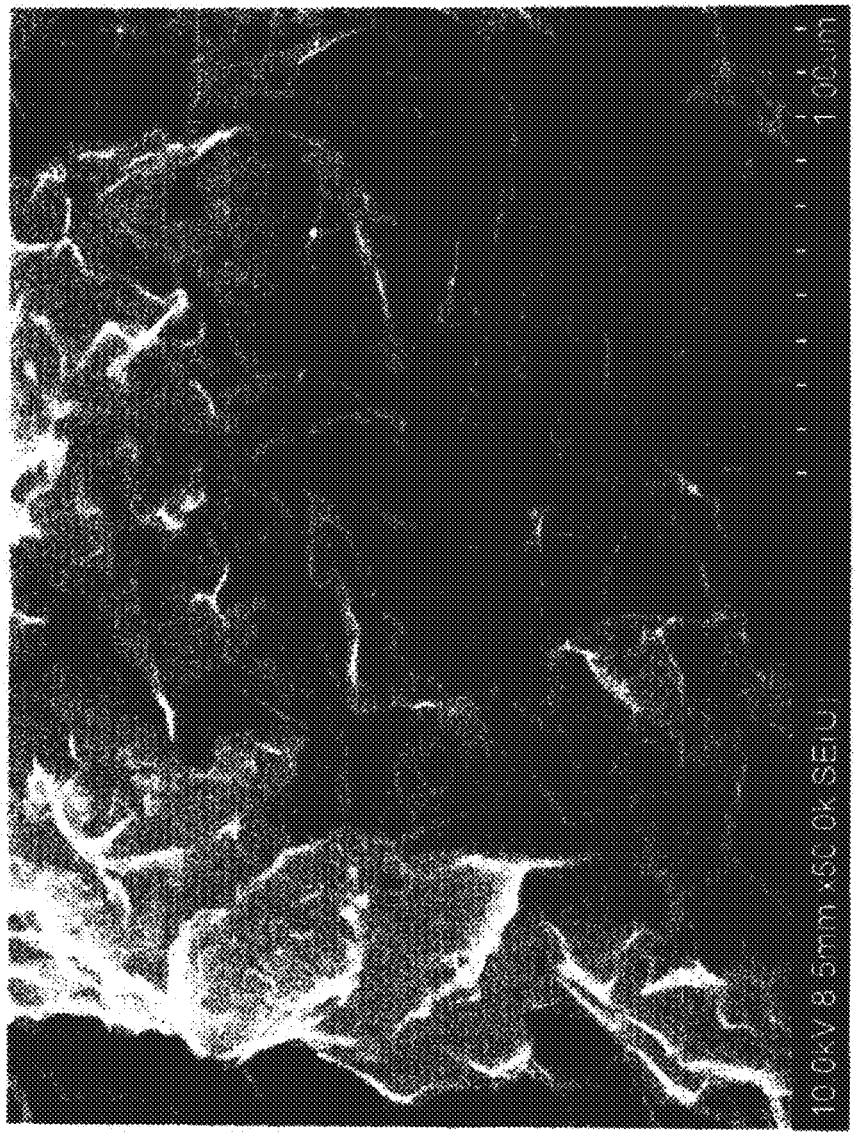
[FIG. 32]

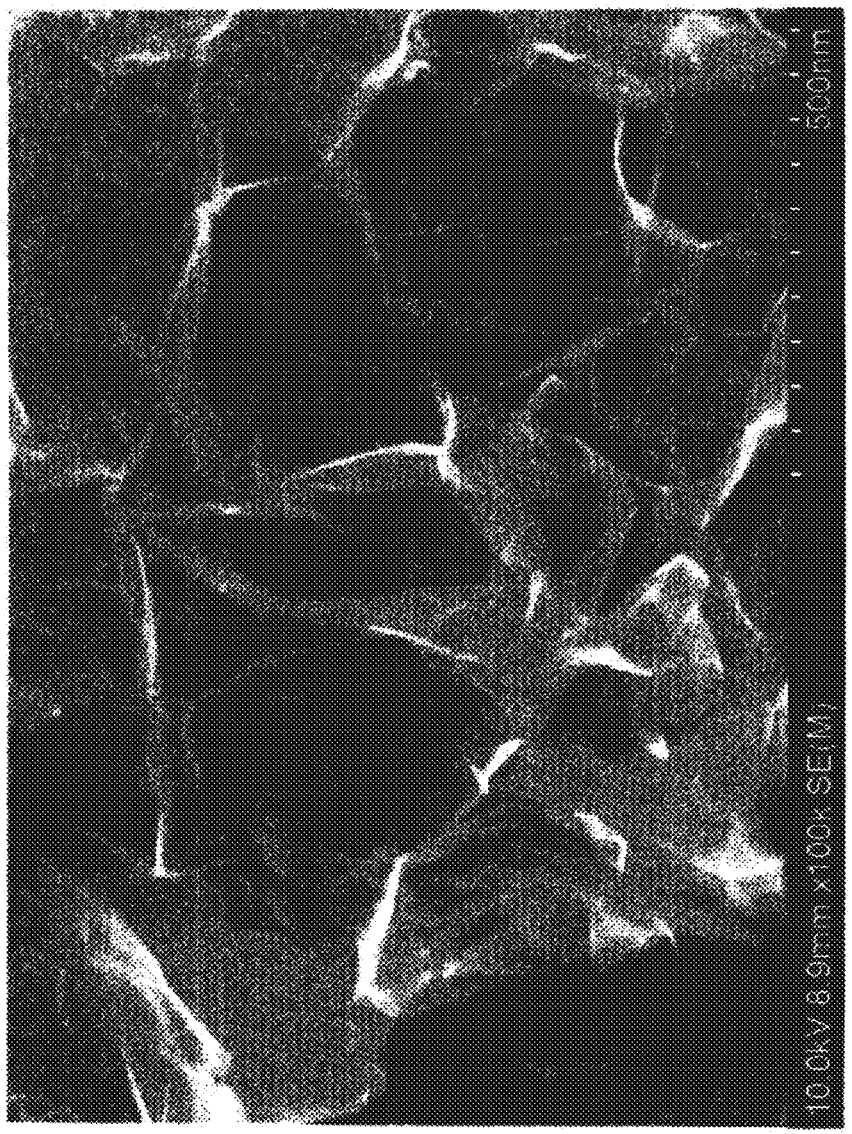
[FIG. 33]

ELECTRIC CABLE, CONDUCTOR, HEATING ELEMENT, METHOD FOR PRODUCING CONDUCTOR AND HEATING ELEMENT, AND HEATING DEVICE USING HEATING ELEMENT

BACKGROUND OF THE INVENTION

(1) Field of the Invention

The present invention relates to a conductor and a heating element made of a fiber bundle which is a bundle of fibers to which a carbide obtained by carbonizing a carbon source which is vegetable material or the like is added, methods for producing the conductor and the heating element, and a heating device using the heating element.

(2) Description of Related Art

Conventional examples of a method for producing nanocarbon include an arc discharge method, a laser evaporation method, and a chemical vapor deposition method (CVD method). Among them, single-walled carbon nanotubes are mass-produced by using a super-growth method, which is one type of the chemical vapor deposition method (CVD method) and is known as a mass production method.

For example, JP 2009-242180 A discloses an invention of a nanocarbon producing device including: a pyrolysis liquid recovery unit configured to thermally decompose an organic matter material to be treated to recover a tar-mixed pyrolysis liquid; a pyrolysis-liquid tar content removing unit configured to remove a tar content from the recovered tar-mixed pyrolysis liquid; and a nanocarbon production unit configured to produce nanocarbon from the pyrolysis liquid from which the tar content has been removed. In the nanocarbon producing device, nanocarbon is produced from the organic matter material to be treated.

For example, JP 2010-042935 A discloses an invention of a nanocarbon producing device including: a rotary drum having a thermal decomposition chamber and a nanocarbon production chamber in a reducing atmosphere, partitioned by a partition plate having a through hole at the center portion thereof; a nanocarbon producing plate disposed in the nanocarbon production chamber; an electric heater disposed at the outer peripheral portion of the rotary drum; a raw material supply unit configured to supply biomass raw material or waste to the thermal decomposition chamber; and a scraping unit configured to scrape off nanocarbon produced on the nanocarbon producing plate. In the nanocarbon producing device, the biomass material or the waste is thermally decomposed in the thermal decomposition chamber and a pyrolysis gas containing hydrocarbons is delivered to the nanocarbon production chamber, and the nanocarbon producing plate and the pyrolysis gas are brought into contact in the nanocarbon production chamber in the reducing atmosphere to produce nanocarbon on the nanocarbon producing plate and to make the nanocarbon grow.

For example, WO 2013/058382 A discloses an invention of a method for producing a sintered body containing carbon nanohoms, the method including a sintering process of heating a preforming body containing carbon nanohoms produced by arc discharge in a fluid to a temperature of 1000° C. or higher and pressurizing and sintering the preforming body.

Carbon nanotubes produced by these producing methods are excellent in electrical conductivity, thermal conductivity, and the like, and therefore the carbon nanotubes have been applied as heating elements. For example, JP 2010-262912 A discloses a heating element including: a heat generating fiber formed by knitting at least one carbon fiber and glass fiber at a predetermined ratio; connecting terminals provided at both ends of the heat generating fiber to apply electricity from an electricity supply line; and a covering unit for covering the surfaces of the heat generating fiber and the connecting terminal. As a heating element using carbon fibers, a heating element is proposed which has high tensile strength while generating heat at high temperature, and is not cut or broken even when tension is applied, and is easily deformed.

Patent document 1: JP 2009-242180 A
Patent document 2: JP 2010-042935 A
Patent document 3: WO 2013/058382 A
Patent document 4: JP 2010-262912 A

SUMMARY OF THE INVENTION

However, in the process of producing the carbon and carbon fibers described above, many production processes are required. Therefore, there is a disadvantage that the cost increases. In addition, in order to produce a heating element, resistance components that generate heat are necessary. Therefore, adjustment of the ratio of them is difficult or production processes become complicated.

The present invention has been made to solve the above problems, and an object of the present invention to provide an electric cable, a heating element, and a conductor that can be easily produced while reducing production cost when the bendable heating element and the bendable conductor are produced, methods for producing the conductor and the heating element, and a heating device using the heating element.

A heating element includes: a carbide obtained by carbonizing vegetable material containing silicon; carbon fibers each of which is continuous and obtained by mixing and spinning the carbide and resin; a carbon fiber bundle formed by bundling up the carbon fibers; and a heating unit configured to store the carbon fiber bundle in a tube having flexibility.

According to the above characteristics, since the present invention contains carbon and silicon which becomes a resistor in advance, production cost is low and the production method is simple, and the heating element can be easily formed. In addition, the present invention is optimal for mass production since no toxic substances and the like are generated in the production processes.

BRIEF DESCRIPTION OF THE DRAWINGS

FIGS. 11A and 11B are schematic views illustrating part of production processes of the carbon fiber according to the embodiment;

FIG. 12 is an electron micrograph of the carbide obtained by a producing device according to the embodiment;

FIG. 13 is an electron micrograph of the carbide obtained by the producing device according to the embodiment;

FIG. 14 is an electron micrograph of the carbide obtained by the producing device according to the embodiment;

FIG. 15 is a schematic view of a heating device according to an embodiment;

FIG. 16 is a schematic view illustrating part of a carbon fiber according to an embodiment;

FIG. 17 is a schematic view illustrating part of production processes of the carbon fiber according to the embodiment;

FIG. 18 is an electron micrograph of the carbon fiber obtained in the production processes according to the embodiment;

FIG. 19 is an electron micrograph of the carbon fiber obtained in the production processes according to the embodiment;

FIG. 20 is an electron micrograph of the carbon fiber obtained in the production processes according to the embodiment;

FIG. 21 is a diagram illustrating the result of a semi-quantitative analysis using X-ray intensity of part of the carbon fiber according to the embodiment;

FIG. 22 is a process flow diagram illustrating production processes of a conductor according to an embodiment;

FIGS. 23A to 23C are cross-sectional views of the conductor according to an embodiment;

FIGS. 25A to 25F are schematic views illustrating a conductor according to another embodiment;

FIGS. 26A to 26E are schematic views illustrating a conductor according to another embodiment;

FIG. 27 is a block diagram illustrating a configuration of a carbide producing device for producing a carbide according to an embodiment;

FIG. 28 is a schematic view illustrating the configuration of the carbide producing device according to the embodiment;

FIG. 29 is a schematic side view of the carbide producing device according to the embodiment;

FIG. 31 is a schematic view illustrating a configuration of an impurity removing device according to an embodiment;

FIG. 32 is an electron micrograph of a carbide obtained by a producing device according to an embodiment; and FIG. 33 is an electron micrograph of the carbide obtained by the producing device according to the embodiment.

DETAILED DESCRIPTION OF PREFERRED EMBODIMENTS

Figure 1:
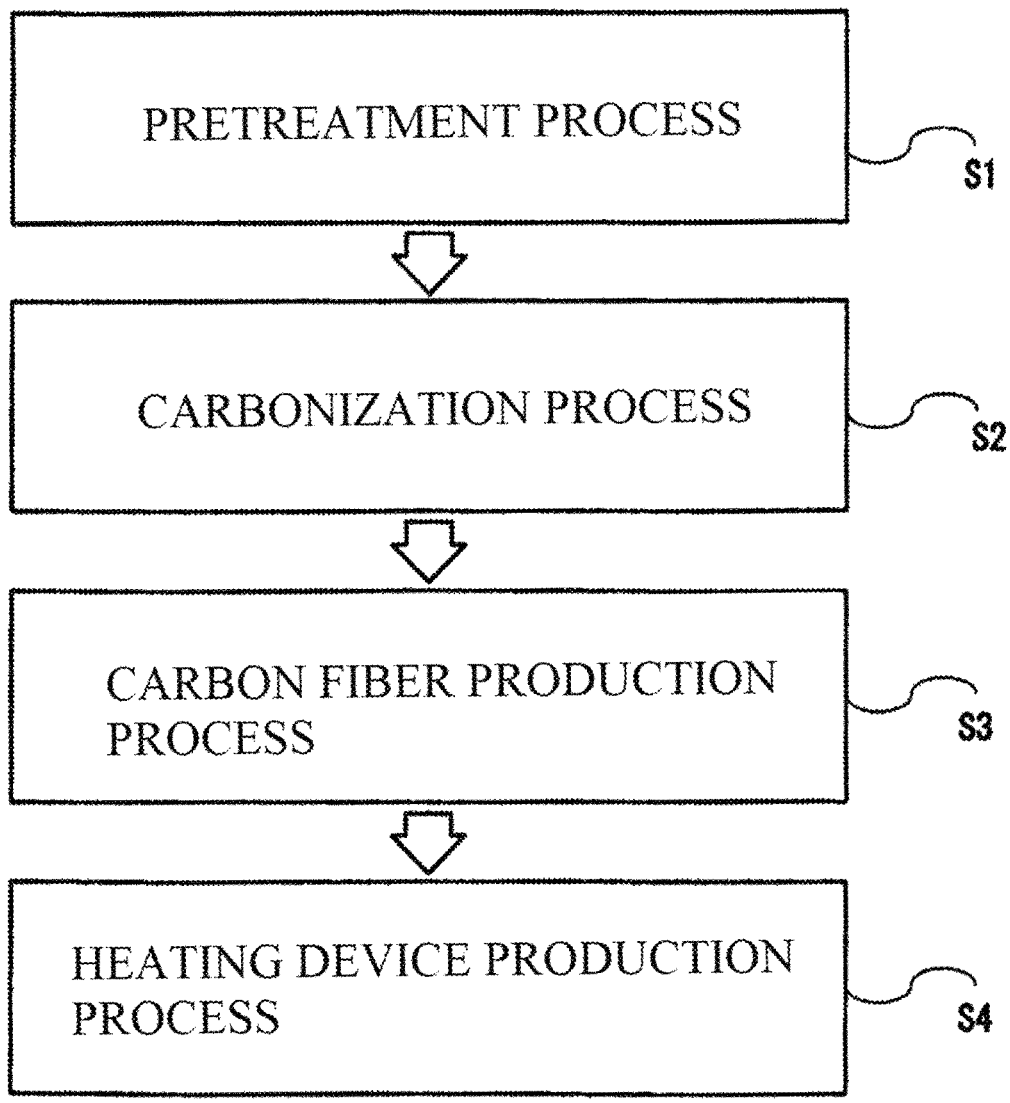
FIG. 1 is a process flow diagram illustrating production processes of a heating device according to an embodiment.

An electric cable, a conductor, a heating element, methods for producing the conductor and the heating element, and a heating device using the heating element according to the present invention will be described in detail with reference to the drawings. Note that embodiments and drawings to be described below are examples of part of the embodiments of the present invention, are not intended to limit the present invention to these configurations, and can be appropriately modified within a range not deviating from the gist of the present invention.

Biomass Material

A vegetable material which is a biomass raw material for producing a carbide 19 according to the present embodiment will be described. In the present invention, the carbide 19 is produced by using the vegetable material which is food residue or a vegetable material to be discarded. Plants, lumber, or the like is used as the vegetable material. However, if a vegetable material to be discarded such as residues generated when plants are harvested is used as raw material for producing the carbide 19, it is possible to obtain raw material at low cost.

TABLE 1

| Composition table of vegetable materials | C | N | P | $P_2O_5$ | K | $K_2O$ | Ca | Mg | Na |
|---|---|---|---|---|---|---|---|---|---|
| Ricestraw | 37.4 | 0.53 | 0.06 | 0.14 | 1.75 | 2.11 | 0.05 | 0.19 | 0.11 |
| Wheat straw | 40.3 | 0.67 | 0.08 | 0.18 | 1 | 1.21 | 0.21 | 0.11 | 0.06 |
| Barley straw | 41.8 | 0.58 | 0.08 | 0.18 | 1.4 | 1.69 | 0.29 | 0.1 | — |
| Rice bran | 40.2 | 1.18 | 0.9 | 2.06 | 1.1 | 1.33 | 0.01 | 0.7 | 0.07 |
| Chaff | 34.6 | 0.32 | 0.03 | 0.05 | 0.31 | 0.37 | 0.01 | 0.07 | 0.13 |
| Buckwheat straw | 40.3 | 1.08 | 0.21 | 0.48 | 3.13 | 3.77 | 1.35 | 0.14 | — |
| Soybean straw | 44.5 | 1.23 | 0.12 | 0.28 | 0.75 | 0.9 | 1.39 | 0.64 | 0.2 |
| Sweet potato vine | 42.7 | 3.74 | 0.22 | 0.5 | 3 | 3.62 | 1 | 0.17 | 0.12 |
| Turnip leaf | 39.8 | 3.33 | 0.27 | 0.62 | 4.35 | 5.24 | 1.7 | 0.8 | 0.49 |
| Carrot leaf | 41.4 | 2.63 | 0.25 | 0.57 | 4.2 | 5.06 | 0.56 | 0.19 | 0.51 |
| Corn culm | 43.8 | 0.92 | 0.09 | 0.21 | 1.32 | 1.59 | 0.24 | 0.12 | — |
| Sugar cane crown | 46.1 | 0.99 | 0.1 | 0.23 | 1.2 | 1.45 | 0.37 | 0.12 | 0.18 |
| Palm cake | 46.2 | 3.86 | 0.69 | 1.58 | 2.69 | 3.24 | 0.21 | 0.3 | 0.04 |
| Peanut shell | 51.1 | 0.75 | 0.02 | 0.06 | 0.47 | 0.57 | 0.17 | 0.05 | 0.05 |
| Mandarin orange peel | 44.5 | 0.76 | 0.05 | 0.11 | 0.58 | 0.7 | 0.4 | 0.06 | 0.07 |
| Red cedar sawdust | 51.1 | 0.07 | — | — | — | — | — | — | — |
| Bark of larch | 59.6 | 0.06 | — | — | — | — | — | — | — |
| Fallen leaf of ginkgo | 50.3 | 0.71 | 0.06 | 0.15 | 0.29 | 0.35 | 1.5 | 0.23 | 0.06 |

Table 1 is a composition table of the vegetable materials. In Table 1, ratios of the components constituting the raw material indicated in the leftmost column are indicated in percentage in the subsequent right columns. For example, rice straw contains 37.4% carbon (C), 0.53% nitrogen (N), 0.06% phosphorus (P), 0.14% phosphoric acid ($P_2O_5$), 1.75% potassium, 2.11% potassium oxide ($K_2O$), 0.05% calcium (Ca), 0.19% magnesium (Mg), and 0.11% sodium (Na).

Here, a plant-derived silicon-containing porous vegetable material does not substantially change even if the material is carbonized at a high temperature (not lower than 300° C. and not higher than 1000° C.), and arrangement of pores can be maintained by removing silicon. Many of the vegetable materials have a structure in which cells are regularly arranged along the axis and silicic acid is deposited on the cell walls to thicken the cell walls.

There is a compressed narrow cell line between silicided cell lines and it is possible to obtain carbon material having a great specific surface area by removing silicon or the like after carbonization. As described above, the vegetable material containing a large amount of, that is, not less than 13% and not more than 35% silicic acid is suitable. In the carbide 19 according to the present invention, carbon serves as an electrically conductive material and silicic acid serves as a resistive material. Therefore, it is possible to easily produce a resistor containing the both materials at a time.

Table 1 illustrates examples of the vegetable material which contains a large amount of carbon. The examples include, in addition to rice straw, wheat straw, barley straw, rice bran, chaff, buckwheat straw, soybean straw, sweet potato vine, a turnip leaf, a carrot leaf, a corn culm, a sugar cane crown, a palm cake, a peanut shell, mandarin orange peel, red cedar sawdust, bark of larch, and a fallen leaf of ginkgo. In addition, a plant itself rather than the residue thereof may be used.

For example, bamboo contains fiber material made of cellulose, hemicellulose, lignin, and minerals such as iron, magnesium, calcium, manganese, copper, and nickel. In addition, when a bamboo leaf is fired, a silanol group (Si—OH) is extracted and is converted into $SiO_4$, and $SiO_4$ is extracted in the process of firing.

TABLE 2

Composition table of vegetable material

| Water content | Ash content | Lipid | Lignin | Hemi-cellulose | Cellulose | Others |
|---|---|---|---|---|---|---|
| 8~10% | 15~18% | 0.1~0.5% | 18~25% | 16~20% | 30~35% | 5~10% |

TABLE 3

Chemical composition table (wt %) of inorganic matter of vegetable material

| $SiO_2$ | $Al_2O_3$ | CaO | $Fe_2O_3$ | $K_2O$ | MgO | MnO | $Na_2O$ |
|---|---|---|---|---|---|---|---|
| 97.14 | 0.04 | 0.48 | 0.03 | 3.2 | 0.16 | 0.18 | 0.09 |

Tables 2 and 3 are composition tables of the vegetable material most suitable for the method of producing amorphous silica or graphene, from among carbon sources 9 which are the vegetable materials in Table 1 described above in the present invention. Table 2 illustrates ratios of the components constituting the raw material indicated in percentage in the lowermost row. For example, water content is 8% to 10%, ash content is 15% to 10%, lipid is 0.1% to 0.5%, lignin is 18% to 25%, hemicellulose is 16% to 20%, cellulose is 30% to 35%, and others are 5% to 10%. As described above, main components of the carbide 19 are lignin, hemicellulose, and cellulose.

Table 3 illustrates chemical composition of the inorganic matter of the vegetable material illustrated in Table 2. In the vegetable material illustrated in Table 2, the organic matter such as cellulose is 80 wt %, and the inorganic matter is 20 wt %. The chemical composition of the inorganic matter of Table 3 is as follows: $SiO_2$ is 92.14 wt %, $Al_2O_3$ is 0.04 wt %, CaO is 0.48 wt %, $Fe_2O_3$ is 0.03 wt %, $K_2O$ is 3.2 wt %, MgO is 0.16 wt %, MnO is 0.18 wt %, and $Na_2O$ is 0.09 wt %. The vegetable material illustrated in Table 2 contains a large amount of silicon oxide ($SiO_2$) as inorganic matter as illustrated in Table 3.

Carbide

FIGS. 12 to 14 illustrate the carbide 19 obtained in a carbonization process S2, produced according to a first or second embodiment. FIG. 12 is an electron micrograph of 50,000 times magnification of the carbide 19 containing silicon (Si) at a weight ratio of 24 wt %, which is the carbide 19 obtained in the carbonization process S2. FIG. 13 is an electron micrograph of 100,000 times magnification of the carbide 19 obtained in the carbonization process S2. FIG. 14 is an electron micrograph of 100,000 times magnification of the carbide 19 containing silicon (Si) at a weight ratio of 24 wt %, which is the carbide 19 obtained in the carbonization process S2. In the electron micrograph illustrated in FIG. 14, a portion where the presence of silicon 66 can be confirmed in the carbide 19 is encircled by a black circle. The carbide 19 preferably contains silicon 66 at a weight ratio of about 18 wt % to 35 wt %.

The carbide 19 illustrated in FIGS. 12 to 14 is a sheet-like monatomic film in which carbon atoms are π bonded with sp2 hybrid orbitals and are arranged in a hexagonal shape on one plane. It can be confirmed that the carbide 19 is a single-walled produced in the carbonization process S2 and contains highly pure carbon, the presence of silicon 66 is observed, and the carbide 19 contains the silicon 66 at a weight ratio of 24 wt %.

It is considered that the carbide 19 obtained in the carbonization process S2 contains a large amount of silicon as illustrated in FIG. 14 and is not strongly reduced and becomes $SiO_2$-x in a case of carbonization in an inert gas, and $SiO_2$-x binds to an aromatic —OH group or the like in the form of —O—Si—O—R, becomes a lignin polysaccharide complex, and is likely to be in the form of C/SiOx.

Therefore, if a large amount of silicon 66 is contained in the carbide 19, the silicon 66 becomes an electric resistor, and a carbide containing a resistor can be produced only by the process of carbonizing a vegetable material without separately providing a resistor. Therefore, it is possible to produce a heating element 51 with a reduced production cost. In particular, a vegetable material having composition as illustrated in Table 2 is effective for producing the heating element 51.

In addition, in the carbide 19 illustrated in FIGS. 12 to 14, nano-level pores are formed in the growth process of forming a skeleton. Due to these pores, when the carbide 19 is used especially for a capacitor, a battery, or the like, the energy density is more than doubled. Therefore, electric conduction performance is also improved. As a result of a semi-quantitative analysis using X-ray intensity called an SQX analysis, the carbide 19 contained silicon 66 (Si), potassium (K), calcium (Ca), and chlorine (Cl) in addition to carbon (C). In particular, since the carbide 19 contains a large amount of silicon 66 (Si) or calcium (Ca) having low conductivity, the carbide 19 has a function as a resistor.

Heating Device

Figure 5:
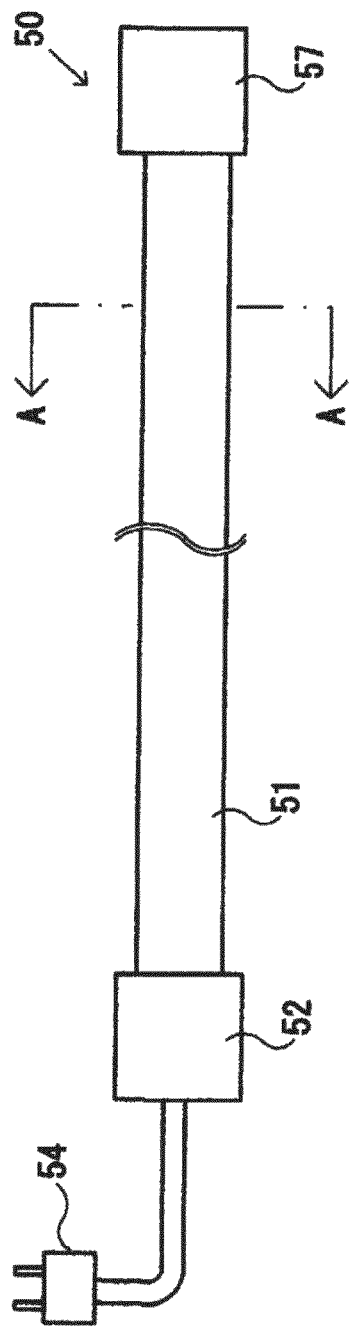
FIGS. 5A and 5B are schematic views of a heating device according to the embodiment.
Figure 5:
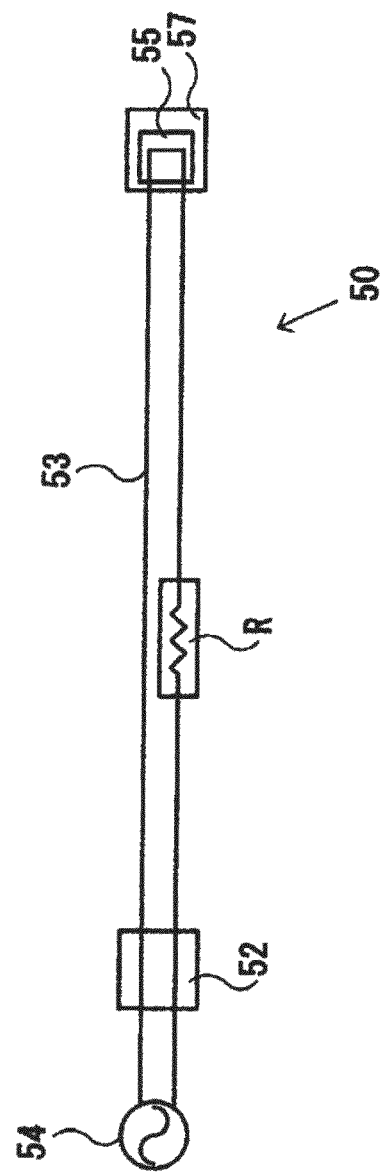

Next, with reference to FIGS. 5A to 9, a heating device 50 will be described. FIG. 5A is an explanatory view as seen from a side of the heating device 50. The heating device 50 is provided with a power supply connecting portion 52 for connecting one end thereof to a power supply 54, and a connecting end portion 57 obtained by subjecting the other end thereof to end processing. In the heating device 50, the heating element 51 is provided between the power supply connecting portion 52 and the connecting end portion 57.

Figure 7:
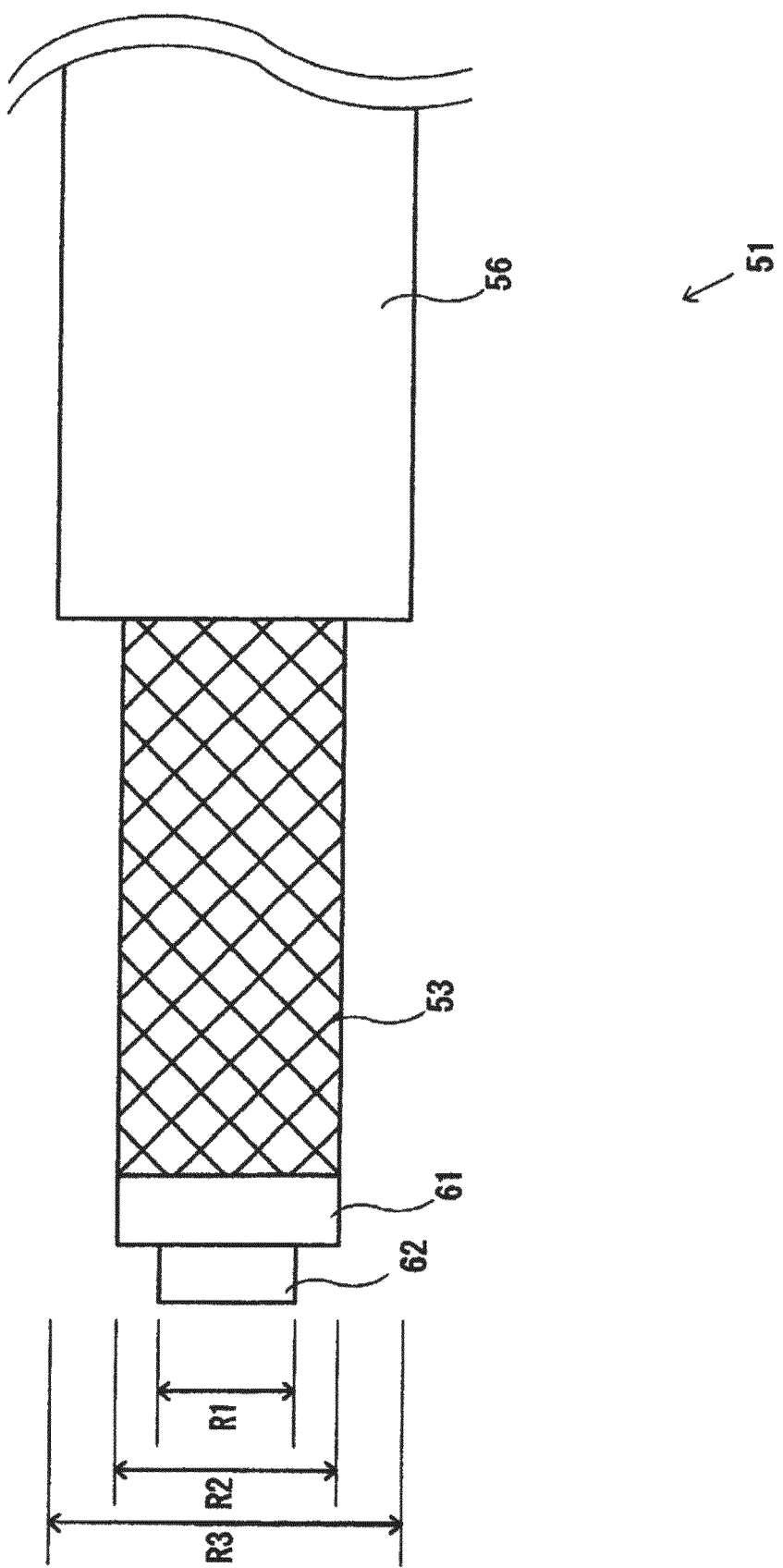
FIG. 7 is a schematic view illustrating part of the heating device according to the embodiment.

As illustrated in FIG. 7, the heating element 51 has a diameter (R3) of about 6 mm and a length of 10 m.

FIG. 5B is a circuit diagram illustrating electrical connection. Though a case where the power supply 54 is a single-phase AC 100 V is illustrated, a three-phase 200 V power supply or a DC power supply may be adopted. The resistance value (R) of this carbon fiber bundle 62, illustrated in FIG. 5B depends on the desired temperature of the heating element 51. If the temperature is about 410° C. to 60° C. in a case where an AC current of 100 V is applied, the resistance value of the carbon fiber bundle 62 in 10 m may be 80Ω to 120Ω taking power consumption into consideration. In the present embodiment, the total resistance of the heating device 50 that outputs heat at 50° C. at the maximum is around 107Ω. Power consumption of the heating device 50 is 93.5 w.

Then, carbon fibers 63 to be described later generate heat, and the carbon fiber bundle 62 obtained by bundling up the carbon fibers 63 generates heat. In addition, strength of the heating element 51 is high, a tensile strength is 200 N, and a compressive strength is 200 N/square centimeters (cm$^2$). The carbon fiber 63 is a continuous single fiber having a diameter in a range from 6 μm to 9 μm.

In the heating device 50, a net-shaped conductor 53 made of a net-shaped conductive material to be described later is connected to the power supply connecting portion 52 and the connecting end portion 57, and covers the periphery of a carbon fiber bundle covering portion 61 to be described later.

The outer periphery of each of the power supply connecting portion 52 and the connecting end portion 57 are covered with an insulator. In the heating device 50, a crimping portion 55 of the connecting end portion 57 causes the carbon fiber bundle 62 and the conductor 53 to be press-fitted to each other and electrically connects the carbon fiber bundle 62 and the conductor 53. In addition, the power supply connecting portion 52 of the heating device 50 connects one end of the power supply to the conductor 53, and the other end of the conductor 53 is connected to the carbon fiber bundle 62. In this manner, power is supplied to the heating device 50 from the power supply 54.

Figure 6:
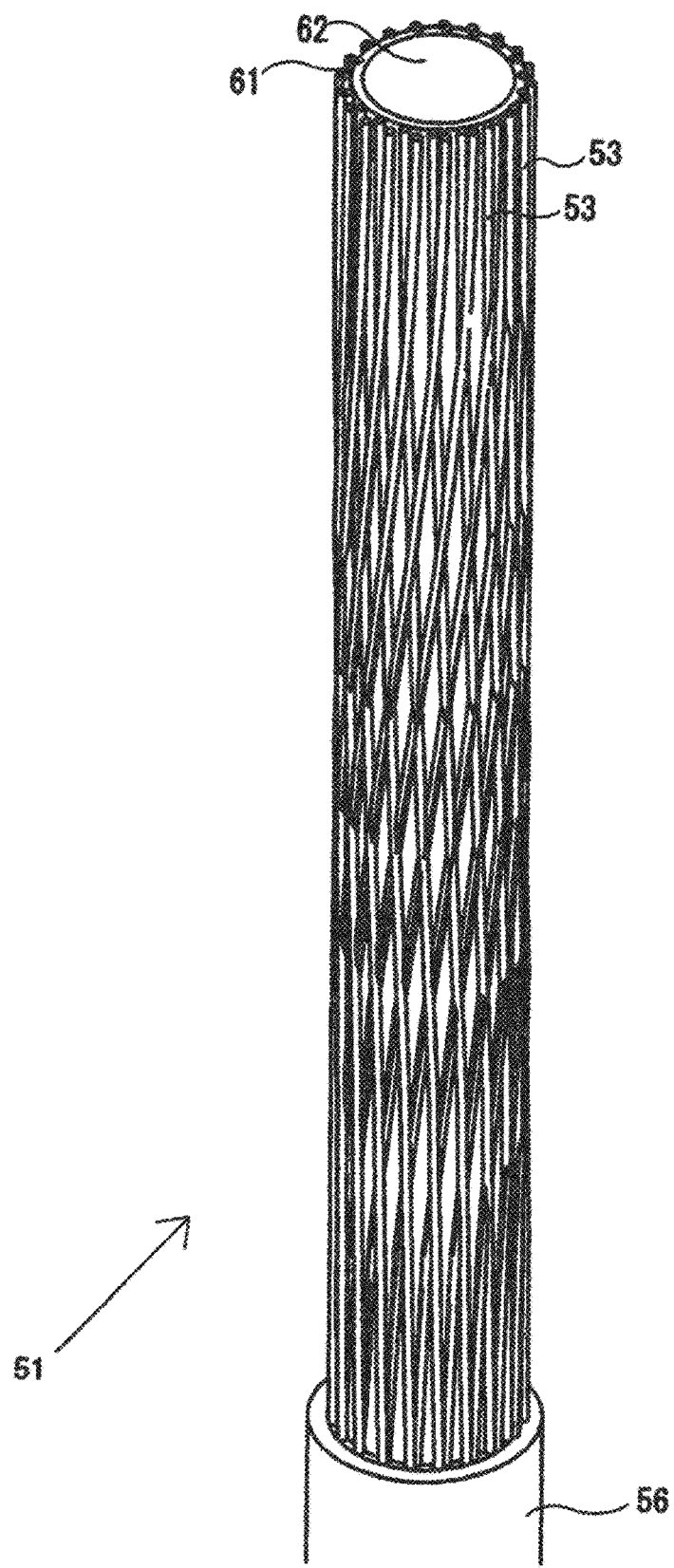
FIG. 6 is a schematic view illustrating part of the heating device according to the embodiment.
Figure 8:
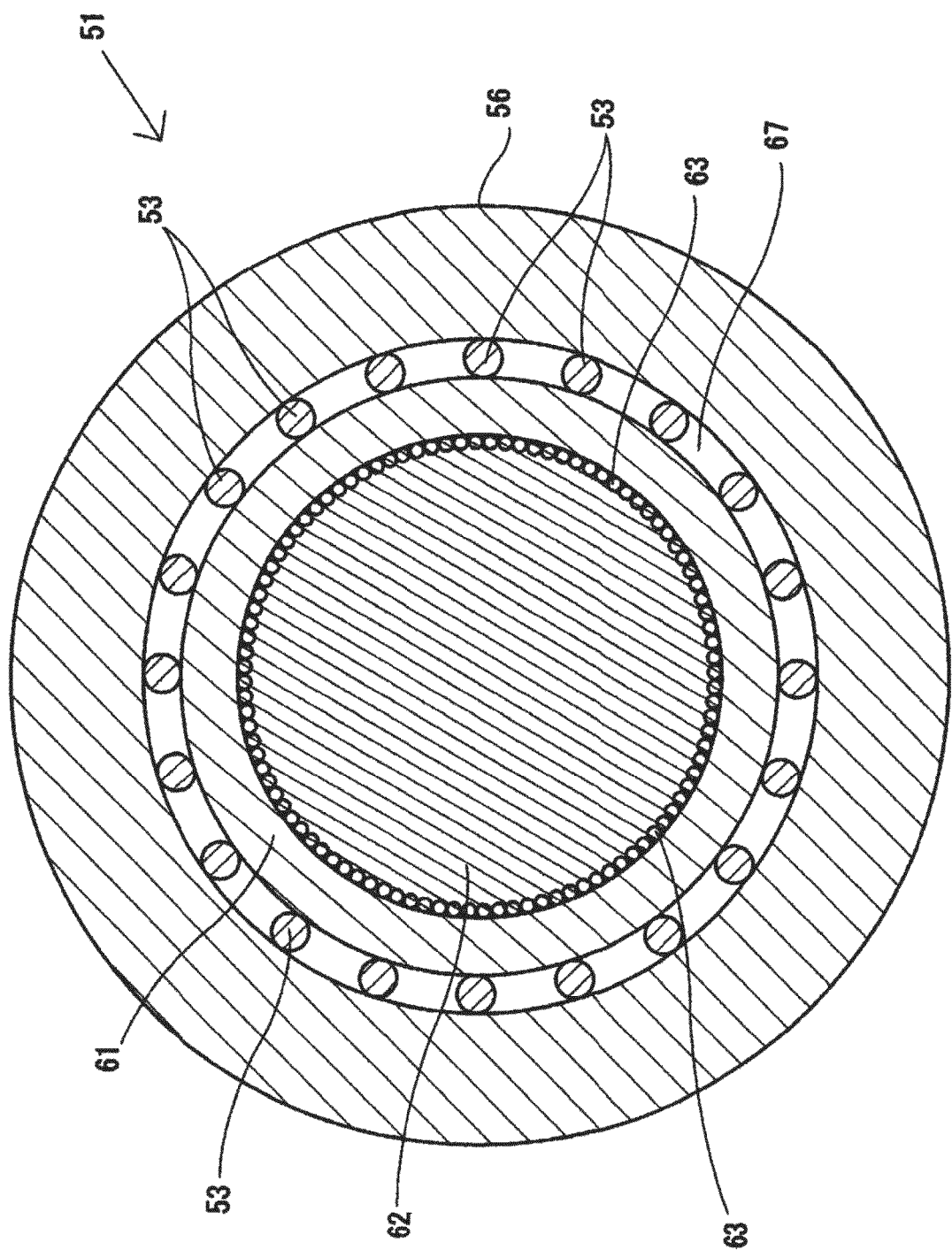
FIG. 8 is an end view of the heating device taken along line A-A illustrated in FIG. 5A.

FIG. 6 is a perspective view illustrating a state in which part of an outer skin 56 of the heating element 51 is removed. FIG. 7 is a perspective view illustrating a state in which part of the outer skin 56 of the heating element 51 and the carbon fiber bundle covering portion 61 is removed. FIG. 8 illustrates an end view of the heating element 51 taken along line A-A in FIG. 5A.

As illustrated in FIGS. 6 to 8, in the heating element 51, the carbide 19 produced by the above-described method is contained in the carbon fiber 63. In the heating element 51, the carbon fiber bundle covering portion 61 is formed. The carbon fiber bundle covering portion 61 is made of a flexible insulating material such as plastics, rubber and resin and covers the periphery of the carbon fiber bundle 62 obtained by bundling up the carbon fibers 63. In the present embodiment, the carbon fiber bundle covering portion 61 is made of silicone resin. As illustrated in FIG. 7, the carbon fiber bundle 62 has a diameter (R1) of 2 mm.

In addition, the heating element 51 is provided with the conductor 53 formed of a net-shaped material having good electrical conductivity and covering the periphery of the carbon fiber bundle covering portion 61. Since the conductor 53 has a net shape, the conductor 53 maintain flexibility, and even if part of the conductor 53 is cut, the other part is brought into contact or joined to the carbon fiber bundle covering portion 61. Therefore, the conductor 53 is less likely to be electrically cut and has a structure strong against bending.

In the heating element 51, the outer skin 56 covers the periphery of the electric conductor 53. The outer skin 56 is made of a bendable insulating material having excellent thermal conductivity, such as plastics, rubber or resin. In the present embodiment, the heating device 50 buried in the soil, a road, or the like is assumed. Since the outer skin 56 is a member which directly contacts the soil, water, and the like, the outer skin 56 is preferably made of polyvinyl chloride or the like which is excellent in thermal conductivity, is friction-resistant, waterproof, and shrinkable. In the heating element 51, the conductor 53 is formed between the outer skin 56 and the carbon fiber bundle covering portion 61; however, a space portion 67 which forms an air layer in a space where the conductor 53 does not exist enhances a heat retaining property.

Figure 9:
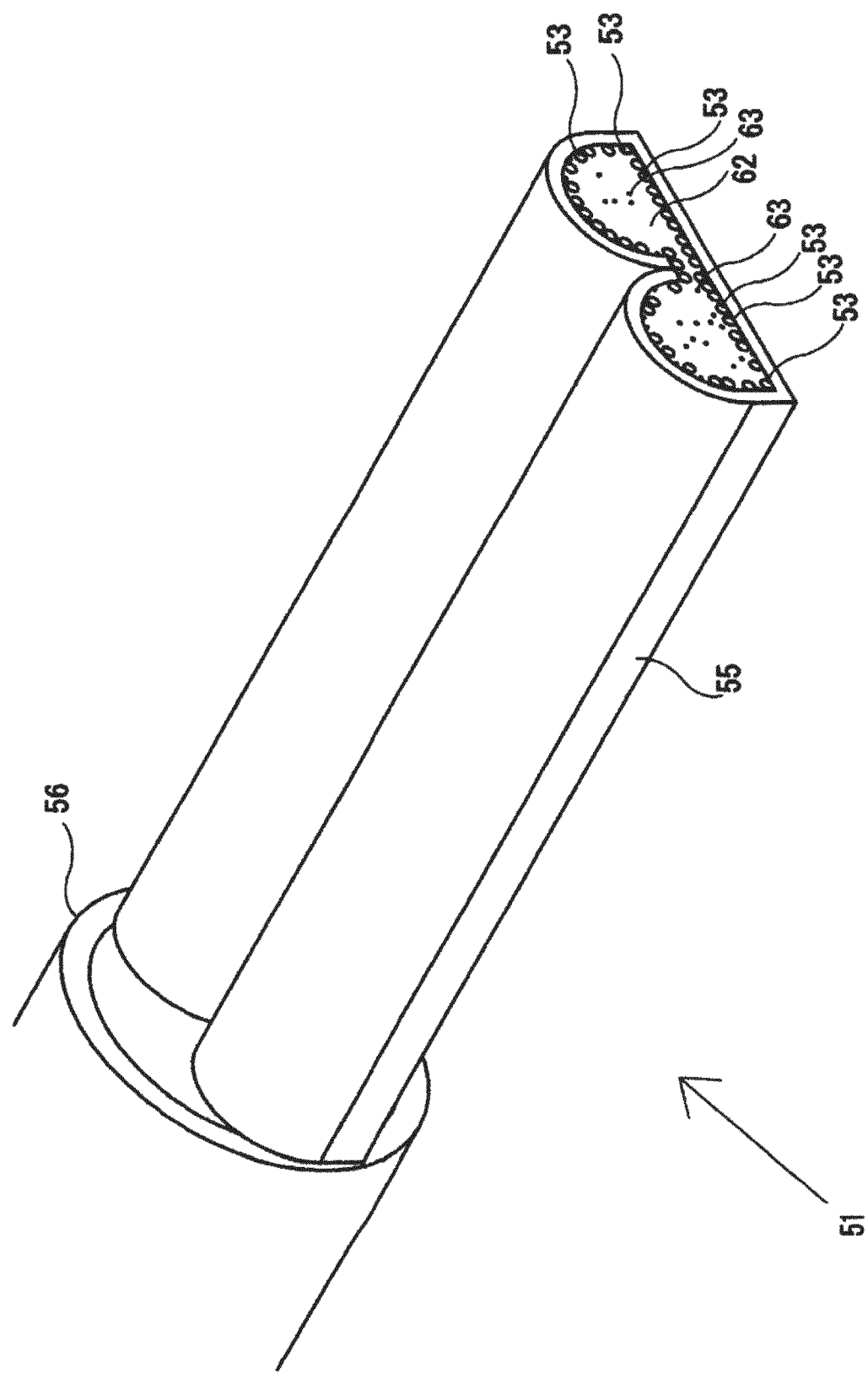
FIG. 9 is a schematic view illustrating part of the heating device according to the embodiment.

As illustrated in FIG. 9, the heating element 51 includes the crimping portion 55 formed by pressing a metal fitting with two metal arcs of the connecting end portion 57, so that the carbon fiber bundle 62 in which the carbon fibers 63 are bundled up and the conductor 53 are mixed and fixed. The crimping portion 55 is covered with resin and insulated from the outside at the connecting end portion 57, but the inside of the crimping portion 55 is electrically connected.

First Embodiment

Plasma Device 10

Figure 2:
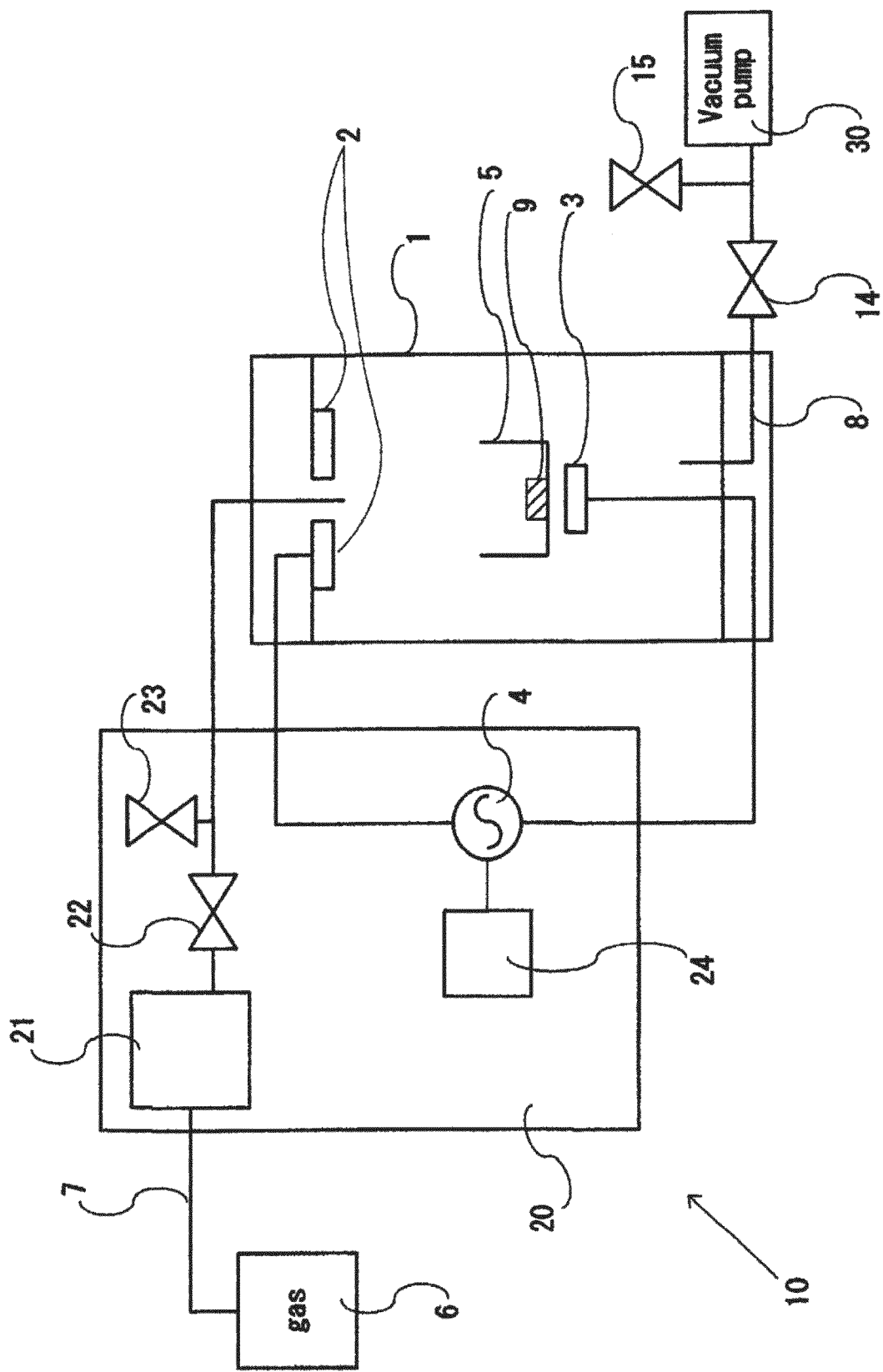
FIG. 2 is a schematic view illustrating a configuration of a plasma device according to a first embodiment.

A plasma device 10 according to the first embodiment will be described with reference to FIG. 2. FIG. 2 is a schematic view illustrating a configuration of the plasma device 10 according to the first embodiment. The plasma device 10 mainly includes an inert gas 6, a control device 20, a chamber 1, and a vacuum pump 30.

Argon was mainly used as the inert gas 6 contained in a gas cylinder; however, examples of the inert gas 6 include helium, neon, and nitrogen. The inert gas 6 can be filled into the chamber 1 from an introduction pipe 7 via a gas amount control device 21. The gas amount control device 21 is capable of adjusting the flow rate of the inert gas 6.

The chamber 1 is connected to a control valve 22, and the inside of the chamber 1 can be depressurized to a vacuum state by the vacuum pump 30. The control valve 22 is connected to the chamber 1 to introduce the inert gas 6 into the chamber 1. A leak valve 23 for releasing the vacuum state in the chamber 1 to atmospheric pressure is provided between the control valve 22 and the chamber 1. A control valve 14 and a leak valve 15 for releasing the vacuum state in the chamber 1 to the atmospheric pressure are also provided between a lead-out pipe 8 for introducing air in the chamber 1 and the vacuum pump 30.

In addition, a temperature control device 24 controls a high-frequency power supply 4 so as to manage temperature retention and temperature retention time, and the like inside the chamber 1. The plasma device 10 of the present first embodiment adopts a method of filling, as a working gas, argon gas which is the inert gas 6 under low pressure close to the vacuum state, making a high current flow between a cathode 2 and an anode 3 which are electrodes, and obtaining thermal plasma produced by arc discharge. A crucible 5 made of carbon is disposed between the cathode 2 and the anode 3, and the carbon source 9 to be described later is put in the crucible 5. By heating the carbon source 9 in a temperature range from 300° C. to 1000° C. by thermal plasma produced by arc discharge, the carbon source 9 is carbonized in about 10 to 30 minutes.

Second Embodiment

Plasma Device 100

Figure 3:
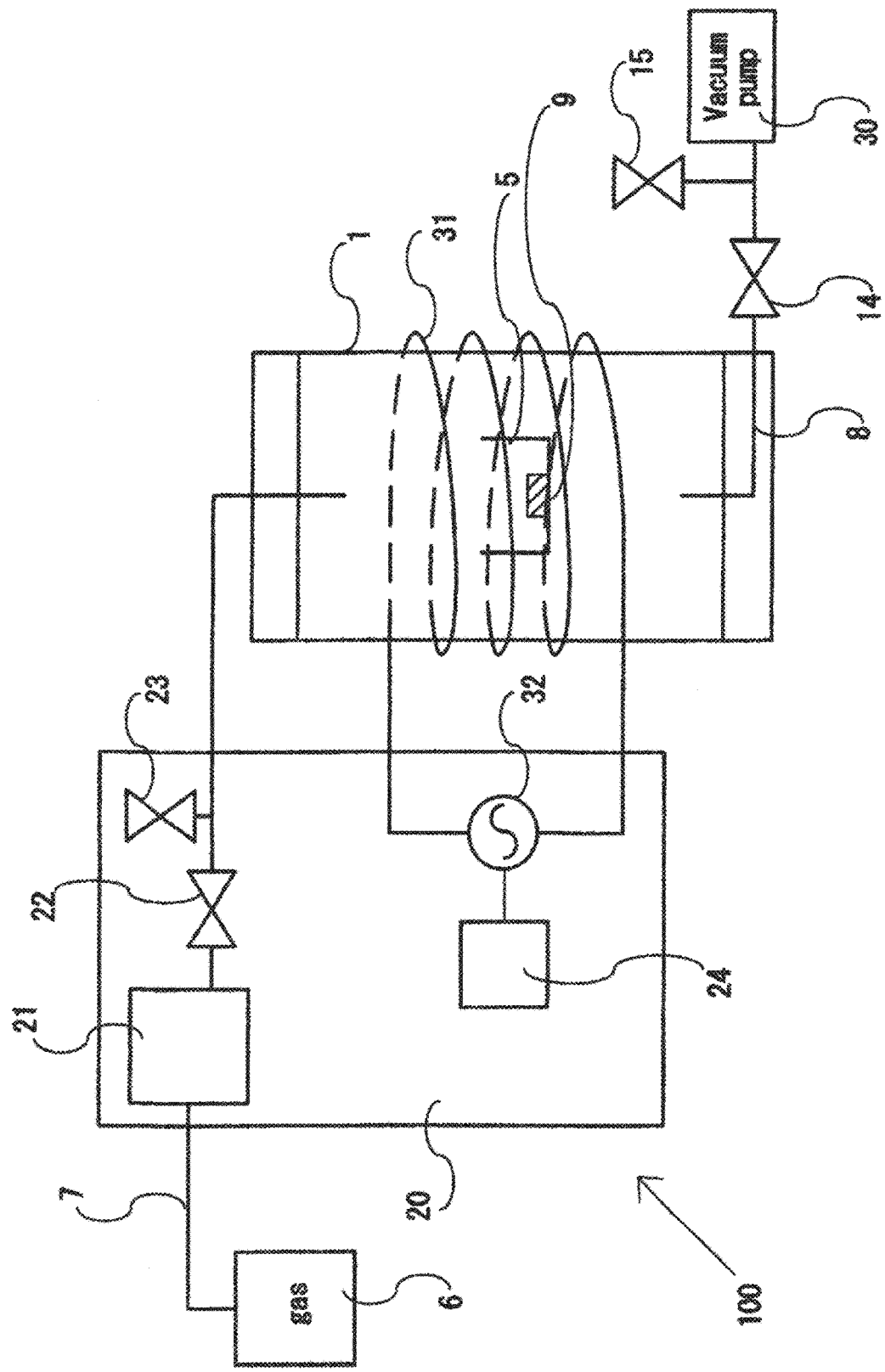
FIG. 3 is a schematic view illustrating a configuration of a plasma device according to a second embodiment.

A plasma device 100 according to a second embodiment will be described with reference to FIG. 3. In FIG. 3, the same reference numerals are given to portions representing the same configurations as those of the plasma device 10, and the portions having the same configuration will not be described. The plasma device 100 mainly includes an inert gas 6, a control device 20, a chamber 1, and a vacuum pump 30. A main point of difference from the plasma device 10 is that in a method for producing thermal plasma, the inert gas 6 for plasma is made to flow, a high-frequency magnetic field of 4 MHz is applied from a high-frequency power supply 32 to a high-frequency coil 31 to produce thermal plasma.

By using the plasma device 10, 100 as described above, even lignin which is difficult to be thermally decomposed can be decomposed.

Note that besides the plasma device described above, there is a method of producing thermal plasma by a plasma device using barrier discharge, corona discharge, pulse discharge, and DC discharge.

Third Embodiment

The same reference numerals are given to configurations the same as those in the first embodiment and a description thereof will be omitted. In FIG. 15, the carbon source 9 produced from the vegetable material in a pretreatment process S1 as described in the first embodiment and oxidation inhibiting substance 70 are placed in a pot 83. Here, it is preferable that the volume of the carbon source 9 is about 1/10 to 2/3 of the capacity of the pot 83. In the pretreatment process S1, it is possible to only pulverize the carbon source 9 with a mill or the like without using a granulating agent.

Here, the oxidation inhibiting substance 70 may be any substance as long as the substance enables burning while suppressing oxygen concentration in order to prevent oxidation at the time of burning, and a gas or a liquid of a halide (carbon dioxide, nitrogen, Halon 2402, Halon 1121, Halon 1301) may be mixed and burned.

Thereafter, the atmosphere in a furnace 81 of a combustion furnace 80 is set to 2000° C. or higher, and the carbon source 9 is burned for 3 hours under the conditions of 20 atm and not lower than 400° C. and not higher than 900° C.

Fourth Embodiment

Process Flow 1

With reference to FIG. 1, production processes for a method of producing a heating device 50 will be described. FIG. 1 is a diagram illustrating a process flow depicting production processes according to the second embodiment. The present process flow will be explained by applying the second embodiment. However, the first embodiment or the third embodiment can be applied in lieu of the second embodiment.

Pretreatment Process

First, in the pretreatment process S1, after the vegetable material is dried as described above, the vegetable material is pulverized, and the pulverized vegetable material and a granulating agent are mixed in the ratio of 10 to 1 with water, the mixture is divided into an appropriate size and is kneaded and heated to about 100° C. on a drying device such as a hot plate to evaporate water content and to produce the carbon source 9. Here, examples of the pulverizing method include a mill, a blender, a grinder, and the like.

Carbonization Process

Next, the carbonization process S2 will be described. In the pretreatment process S1, about 0.8 g of the carbon source 9 is put in the crucible 5 and covered with a metal net or the like. The crucible 5 is disposed at a predetermined heating location in the plasma device 10, 100 described above. The pressure inside the chamber 1 is reduced to 80 Pa by the vacuum pump 30 and the inert gas 6 is injected into the chamber 1 at a flow rate of 8 to 10 ml/min, and the inside of the chamber 1 is maintained at a pressure of 1300 Pa to 1500 Pa.

Figure 4:
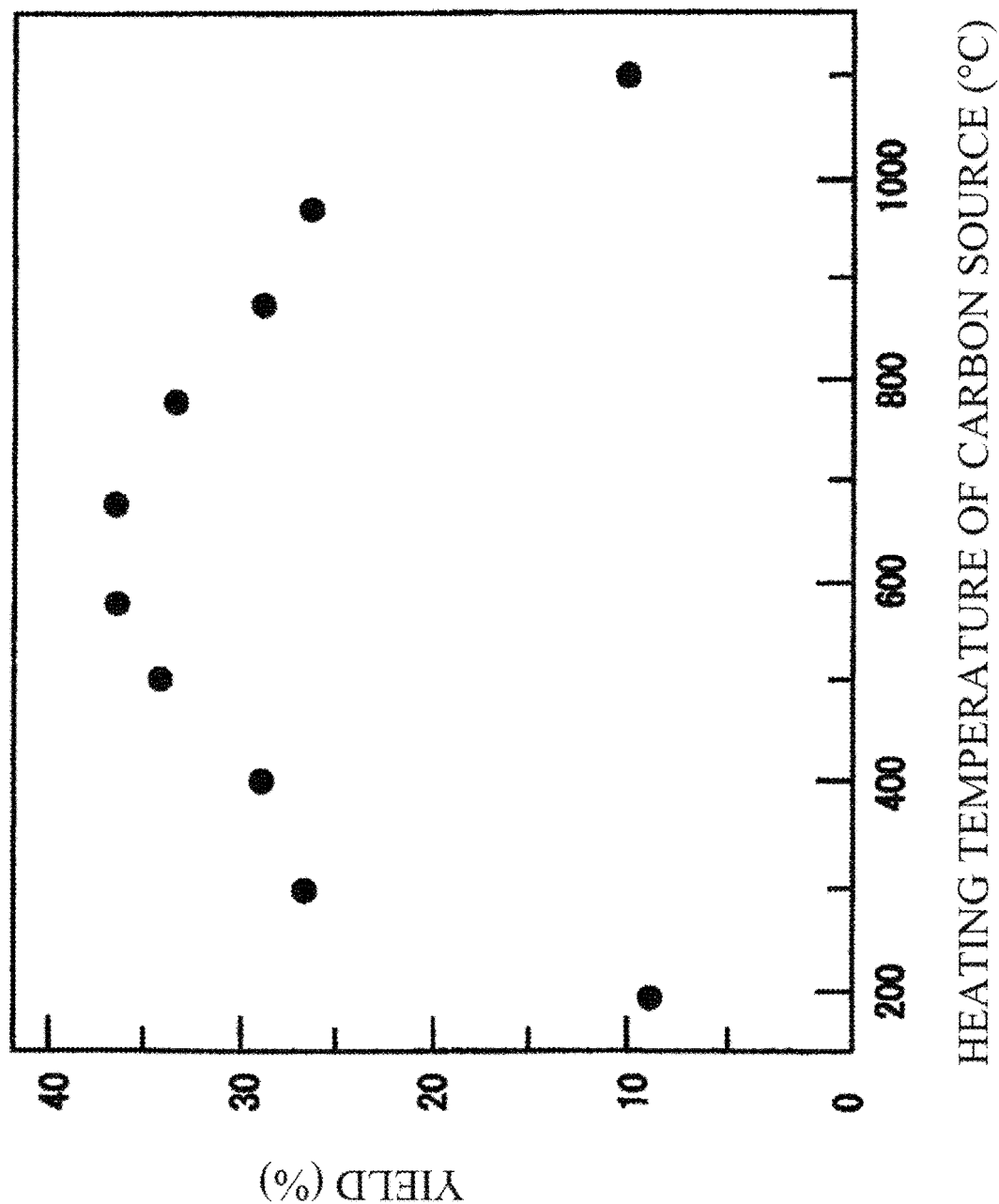
FIG. 4 is a diagram illustrating relationship between the temperature of a carbon source and the theoretical yield of a carbide in the production process to the embodiment.

As illustrated in FIG. 4, the applicant performed the carbonization process S2 in a range from 200° C. to 1100° C. in an increment of 100° C. by thermal plasma, and obtained temperatures and yields when the carbon source 9 was carbonized. The value obtained by dividing the weight of the carbide 19 obtained from 0.8 g of the carbon source 9 by 0.8 g (the weight of the carbon source 9) is illustrated in FIG. 4. The highest yield of 36% was obtained in a range from 600° C. to 700° C., and relatively large yields were obtained in a range from 300° C. to 1000° C. inclusive. In this measurement, rice straw, rice bran, coconut shell, chaff, and peanut shell, and the like were used, and similar results were obtained.

In addition, a carbide containing 24 wt % of each of carbon and silicon 66, which is a good percentage for the heating element, can be produced by the carbonization process at 300° C. or higher and 1000° C. or lower. Electric resistivity of carbon is about 1.64 μΩ·m, and electric resistivity of the silicon 66 is about 1000 Ω·m. The silicon 66 constitutes most resistance components of the carbon fiber 63.

Carbon Fiber Production Process

Next, a carbon fiber production process S3 for producing the carbon fiber 63 using the carbide 19 obtained as described above will be described using two methods according to the fourth embodiment and a fifth embodiment.

Fifth Embodiment

First, a method of spinning the carbon fiber 63 will be described with reference to FIGS. 16 to 21. FIG. 17 is a schematic view illustrating a spinning method using a spinning device 40. FIGS. 18 and 19 are electron micrographs illustrating a cross section of the carbon fiber 63. FIG. 20 is an electron micrograph illustrating a side surface of the carbon fiber 63. FIG. 21 is an explanatory diagram illustrating the result of a semi-quantitative analysis using X-ray intensity of part of the carbon fiber 63 illustrated in FIG. 18 according to the embodiment.

By using the carbide 19 obtained in the above-described carbonization process (S2), spinning dope 41 for spinning is prepared. In order to prepare the spinning dope 41, a dispersion liquid is prepared first. The dispersion liquid is prepared by adding the carbide 19 of about 5 wt % to 20 wt % to a solvent such as acetone, methyl isobutyl ketone or dimethyl sulfoxide and dispersing the carbide 19 by using ultrasonic dispersion, a mill, or the like. Water, sodium cholate, sodium deoxycholate, and the like may also be used as the solvent.

Then, a binder is mixed with this dispersion liquid to prepare the spinning dope 41. The spinning dope 41 is extruded by an extruder 42, is discharged from a thin nozzle 43 disposed in a coagulating liquid 45 in a coagulation bath 44, is solidified by chemical reaction between the coagulating liquid 45 and the above-described solvent, and is made into fibers. In this reaction, the solvent in the spinning dope 41 is brought into contact with the coagulating liquid 45 and is eluted into the coagulating liquid. This reaction is desolvation reaction, and the above-described solvent dissolves into the coagulating liquid.

Therefore, as the coagulating liquid 45, a liquid into which the above-described solvent dissolves is used. For example, in a case where polyvinyl alcohol is used as the binder, methanol is used as the coagulating liquid for the solvent of dimethyl sulfoxide. In addition, in a case where polyvinyl alcohol is used as the binder, caustic soda is used as the coagulating liquid for the solvent of water. It is also possible to use an organic solvent as a dispersant and the coagulating liquid. In addition, in a case where an epoxy resin is used as the binder, acetone is used as the coagulating liquid.

As the binder, a thermosetting resin such as an epoxy resin, polyvinyl alcohol, nylon, rayon, acrylic, a phenolic resin, a melamine resin, an urea resin, an unsaturated polyester resin, an alkyd resin, and thermosetting polyimide, a thermoplastic resin such as polyethylene, polypropylene, polystyrene, an acrylonitrile resin, a butadiene resin, a styrene resin, a methacrylic resin, vinyl chloride, or an engineering plastic such as polyamide, polyacetal, polyethylene terephthalate, ultrahigh molecular weight polyethylene, polycarbonate, polyphenylene sulfide, polyether ether ketone, polytetrafluoroethylene, polyether imide, polyarylate, and polyimide can be used. The binder of 0.1 wt % to 10 wt % is mixed with the carbide 19 of 5 wt % to 18 wt %.

In addition, the discharged carbon fiber 63 is stretched and delivered by an upper roller 47 and a lower roller 46 from the coagulation bath 44, and is finally taken up as a continuous carbon fiber 63 at a speed of 1.1 m/min to 2 m/min.

In addition, it is possible to prepare a dispersion liquid containing 5 to 17% of the carbide 19, 0.1 to 10% of urethane as a binder, and 82% of a mixture of methyl ethyl ketone, toluene, and cyclohexanone, and containing the carbide 19 at a high concentration. Among them, the amount of the carbide 19 may be adjusted according to the resistance value of the heating element 51 finally obtained.

As described above, the method for producing the carbon fiber 63 by using a wet spinning method has been described; however, a method for producing a carbon fiber 63 by using a dry spinning method, a melt spinning method, an air-gap spinning method, or a dry-wet spinning method may be adopted.

In the case of melt spinning, examples of a polymer include polyester, nylon, and polypropylene, in the case of dry spinning, examples of a polymer include acetate, polyurethane, and acrylic.

Note that it is preferable to use an organic solvent as a dispersant and the coagulating liquid so as to facilitate production even in a state where no polymer is contained.

As illustrated in FIGS. 16, 18 and 19, the carbon fiber 63 obtained by the above-described method contains silicon 66 in some places in addition to carbon. In addition, FIG. 21 illustrates the result of the semi-quantitative analysis using X-ray intensity of the electron micrograph illustrated in FIG. 19. The carbon fiber 63 contains silicon (Si) 66, calcium (Ca), aluminum (Al), and potassium (K) in addition to carbon (C). As illustrated in FIG. 20, the carbon fiber 63 has a diameter of about 6 μm. The carbon fiber bundle 62 is a bundle of about 100,000 to 120,000 carbon fibers 63.

In the present embodiment, approximately 110,000 carbon fibers 63 are used. The electric resistivity of the carbon fiber bundle 62 is $2.92 \times 10^{-3}$ (Ω·m). The electric resistivity of the carbon fiber 63 is 321 Ω·m.

Then, as illustrated in FIG. 16, graphene containing carbon 65 and silicon (Si) 66 is dissolved in a flexible organic solvent with an epoxy resin (electric resistivity $10^{12}$ to $10^{17}$ Ω·m) used as the binder, the carbon fiber 63 is spun by the wet spinning method, and the carbon fibers 63 are made into the carbon fiber bundle 62. Thus, the heating element 51 having flexibility can be produced.

Sixth Embodiment

The carbon fiber 63 can be produced mainly by impregnating the surface of a base material fiber 64 with the carbide 19 and making the carbide 19 adhere to the surface. Each process will be described below with reference to FIGS. 10 to 11B in order.

Base Material Fiber

Figure 10:
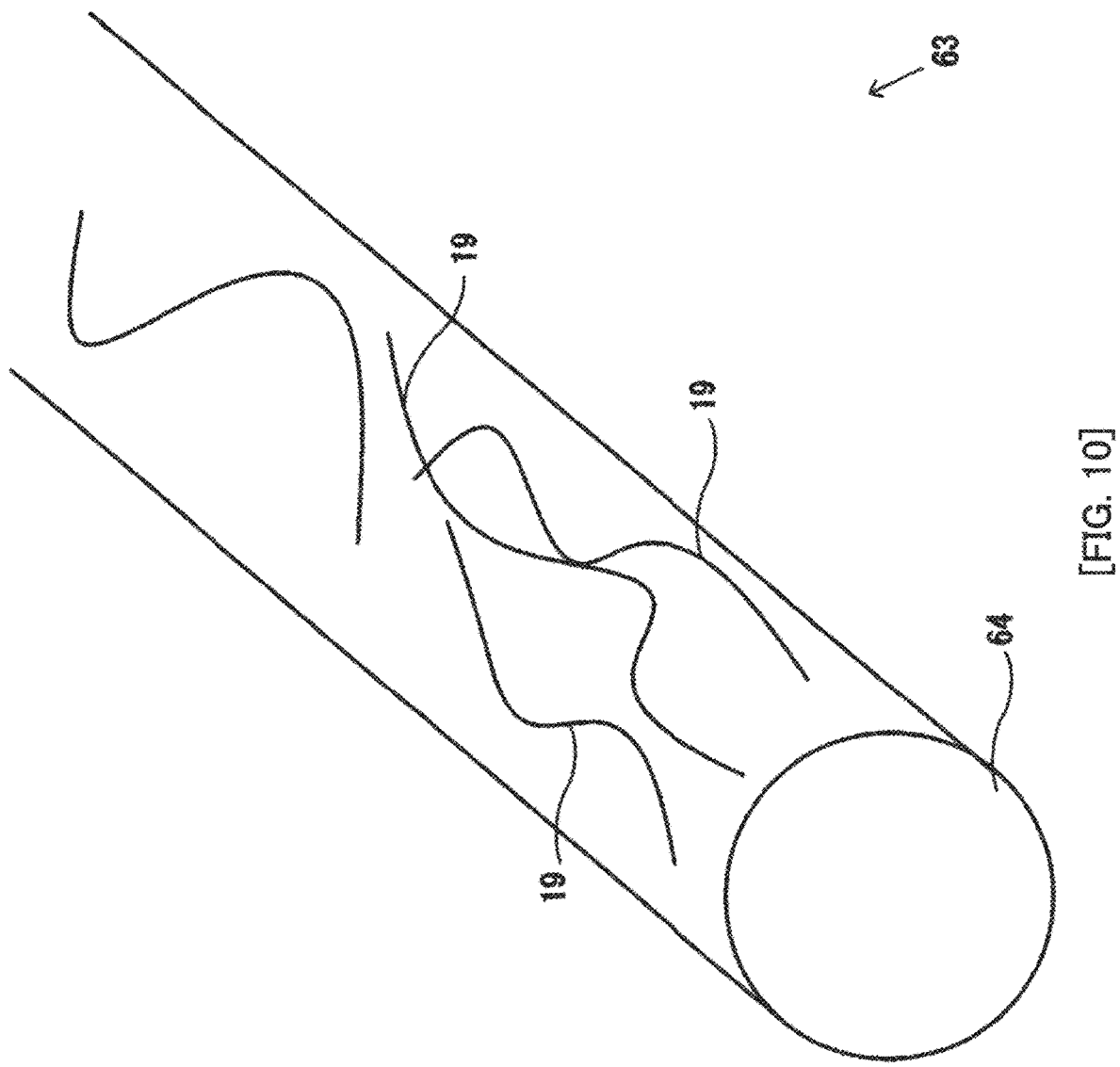
FIG. 10 is a schematic view illustrating part of a carbon fiber according to an embodiment.

As illustrated in FIG. 10, the base material fiber 64 can be formed of carbon material, resin material, metal material, ceramic material or the like. In the case where the base material fiber 64 is a carbon fiber, examples of the carbon fiber include a PAN-based carbon fiber produced by carbonizing a polyacrylonitrile resin, and a pitch-based carbon fiber produced by carbonizing a pitch fiber made from coal tar or petroleum heavy fractions. The base material fiber 64 has a thickness of 5 μm to 15 μm, and the cross-sectional shape thereof is a circle, a triangle, a square, an ellipse, or the like.

An arc discharge method, a laser evaporation method, a chemical vapor deposition method (CVD method), or the like may be used for the carbonization process. However, of course, the methods described in the above-described first to third embodiments may be used. Regarding the shape of the base material fiber 64, both a continuous single fiber and a staple fiber can be produced by using the above materials.

Carbide Adhesion Process

As illustrated in FIG. 11A, the carbide 19 is mixed in an adhesion solvent 93 to be described below, and an adhesion liquid 92 is prepared in which the carbide 19 is dispersed at weight concentration of about 10% in the adhesion solvent 93 in an adhesion layer 91 with a stirring mill, an ultrasonic oscillator or a stirrer.

As the adhesion solvent 93, water, alcohols such as ethanol, methanol, isopropyl alcohol, or organic solvents such as toluene, acetone, tetrahydrofuran, methyl ethyl ketone, hexane, n-hexane, ethyl ether, xylene, methyl acetate, and ethyl acetate can be used.

A bundle of the base material fibers 64 in which the base material fibers 64 are bundled is immersed in the adhesion layer 91. At this time, Van der Waals force acts on the carbide 19, and the carbide 19 adheres to the bundle of the base material fibers 64.

Note that at the stage where the adhesion liquid 92 permeates the bundle of the base material fibers 64, the bundle of the base material fibers 64 to which the carbide 19 adheres is dried to obtain the carbon fiber 63. Then, the obtained carbon fiber bundle 62 may be made into a tube shape by using silicone resin or the like.

Impregnated Solution Process

Next, as illustrated in FIG. 11B, in the case of further reinforcing strength or the like of the bundle of the base material fibers 64 to which the carbide 19 adheres, an adhesion device 90 may cause the bundle of the base material fibers 64 to be impregnated with a resin impregnated solution 95 of a resin impregnated layer 94, and may cover the periphery of the base material fibers 64 with resin. The bundle of the base material fibers 64 to which the carbide 19 adheres is immersed in the dissolved resin impregnated solution 95, so that the base material fibers 64 are impregnated with resin.

As a resin material with which the bundle is impregnated, a thermosetting resin such as epoxy resin, a phenolic resin, a melamine resin, an urea resin, an unsaturated polyester resin, an alkyd resin, and thermosetting polyimide, or a thermoplastic resin such as polyethylene, polypropylene, polystyrene, an acrylonitrile resin, a butadiene resin, a styrene resin, a methacrylic resin, and vinyl chloride, or an engineering plastic such as polyamide, polyacetal, polyethylene terephthalate, ultrahigh molecular weight polyethylene, polycarbonate, polyphenylene sulfide, polyether ether ketone, polytetrafluoroethylene, polyether imide, polyarylate, and polyimide can be used.

Seventh Embodiment

Production Process of Heating Device

Next, with reference to FIGS. 5A to 8, a heating device production process S4 will be described. The carbon fibers 63 obtained in the above carbide adhering process or the impregnated solution process are bundled up and made into the carbon fiber bundle 62. The periphery of the carbon fiber bundle 62 is covered with material such as silicone resin while being stretched, and the linear carbon fiber bundle covering portion 61 covering the carbon fiber bundle 62 is wound up.

Then, while covering the periphery of the carbon fiber bundle covering portion 61 containing the carbon fiber bundle 62 therein with the net-shaped conductor 53, the carbon fiber bundle covering portion 61 is covered with the outer skin 56 and is wound in a tube shape to form the heating element 51 in a linear form.

Then, the heating device 50 is configured by cutting the heating element 51 to a necessary length of 10 m and connecting the power supply connecting portion 52 and the connecting end portion 57 to both ends of the heating element 51. Thus, power can be supplied to the heating element 51.

Structure of Conductor

Eighth Embodiment

Bendable Conductor

The present embodiment will be described with reference to FIGS. 23A to 23C and 26A to 26F regarding the structure of a bendable conductor 150 made of graphene 113 obtained by further purifying the carbide 19 and having improved carbon purity and used for a signal line or a power line.

FIG. 23A illustrate a single-wire conductor 150 containing graphene 113 having high carbon purity obtained by the method to be described later. In the conductor 150, a carbon fiber bundle covering portion 161 is formed. The carbon fiber bundle covering portion 161 is made of an insulating material such as a plastic, rubber, or resin capable of bending and covers the periphery of a carbon fiber bundle 162 obtained by bundling up carbon fibers 163. In the present embodiment, the carbon fiber bundle covering portion 161 is made of silicone resin. The carbon fiber 163 is a continuous single fiber having a diameter in a range from 6 μm to 9 μm.

As illustrated in FIG. 7, the carbon fiber bundle 162 has a diameter (R1) of 2 mm. In addition, the conductor 150 is provided with an outermost periphery covering portion 165 which covers the outermost periphery of the conductor 150 with polyvinyl chloride, polyethylene or the like so that the conductor 150 has a structure resistant to corrosion and wear. Thus, the conductor 150 which has flexibility, is less likely to be broken, and is lightweight is formed. Note that the thickness of the conductor 150 may be determined according to the intended use, and may be determined according to the number of carbon fibers 163 contained in the carbon fiber bundle 162.

FIG. 23B illustrates a conductor 150 including two single wires illustrated in FIG. 23A described above and containing graphene 113 having high carbon purity obtained by the method to be described later. The conductor 150 includes in the inside thereof a strand wire obtained by twisting the two single wires.

In the conductor 150, a carbon fiber bundle covering portion 161 is formed. The carbon fiber bundle covering portion 161 is made of an insulating material such as a plastic, rubber material, or resin capable of bending and covers the periphery of a carbon fiber bundle 162 obtained by bundling up carbon fibers 163. In the present embodiment, the carbon fiber bundle covering portion 161 is made of silicone resin.

As illustrated in FIG. 7, the carbon fiber bundle 162 has a diameter (R1) of 2 mm. In addition, the conductor 150 is provided with an outermost periphery covering portion 165 which covers the outermost periphery of the conductor 150 with polyvinyl chloride, polyethylene or the like so that the conductor 150 has a structure resistant to corrosion and wear. Thus, the conductor 150 which has flexibility, is less likely to be broken, and is lightweight is formed. Note that the thickness of the conductor 150 may be determined according to the intended use, and may be determined according to the number of carbon fibers 163 contained in the carbon fiber bundle 162.

FIG. 23C illustrates a conductor 150 including three single wires illustrated in FIG. 23A described above and containing graphene 113 having high carbon purity obtained by the method to be described later. The conductor 150 includes in the inside thereof a strand wire obtained by twisting the three single wires.

In the conductor 150, a carbon fiber bundle covering portion 161 is formed. The carbon fiber bundle covering portion 161 is made of an insulating material such as a plastic, rubber material, or resin capable of bending and covers the periphery of a carbon fiber bundle 162 obtained by bundling up carbon fibers 163. In the present embodiment, the carbon fiber bundle covering portion 161 is made of silicone resin.

As illustrated in FIG. 7, the carbon fiber bundle 162 has a diameter (R1) of 2 mm. In addition, the conductor 150 is provided with an outermost periphery covering portion 165 which covers the outermost periphery of the conductor 150 with polyvinyl chloride, polyethylene or the like so that the conductor 150 has a structure resistant to corrosion and wear. Thus, the conductor 150 which has flexibility, is less likely to be broken, and is lightweight is formed. Note that the thickness of the conductor 150 may be determined according to the intended use, and may be determined according to the number of carbon fibers 163 contained in the carbon fiber bundle 162.

FIGS. 26A and 26B are views of a binding wire 180 obtained by binding the carbon fiber bundle 162 formed by bundling up the carbon fibers 163 with a temporarily winding wire 185 made of a copper wire or a polymer for temporarily winding the carbon fiber bundle 162. As a result, the carbon fiber bundle 162 is bound while being hardly twisted. FIG. 26A is a side view of the temporarily winding wire 185, and FIG. 26B is a cross sectional view of the temporarily winding wire 185.

FIG. 26C is a side view of a plurality of twisted binding wires 180. FIG. 26D is a cross sectional view of the plurality of twisted binding wires 180.

FIG. 26E illustrates a cross section of a conductor obtained by further applying insulating and bendable coating on the plurality of twisted binding wires 180.

As described above, it is possible to adjust the hardness of the conductor 150 by providing the temporarily winding wire 185. In addition, the adhesion degree of the carbon fibers 163 can also be adjusted.

Ninth Embodiment

Shrinkable Conductor

With reference to FIGS. 24A and 24B and 25A to 25F, the structure of a bendable and shrinkable conductor 150 will be described. The conductor 150 is made of graphene 113 obtained by further purifying the carbide 19 in processes of a purification process S2-1 to be described later and having improved carbon purity, and is used for a signal line or a power line.

Figure 24:
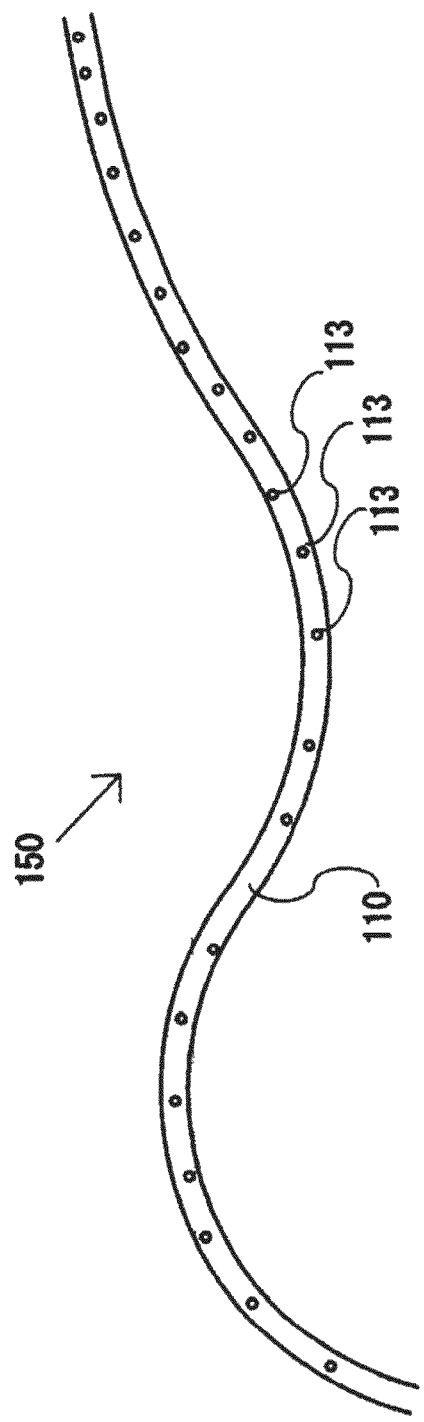
FIGS. 24A and 24B are schematic views illustrating a conductor according to another embodiment.
Figure 24:
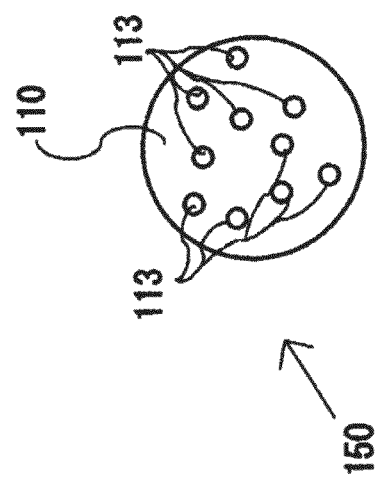
Figure 30:
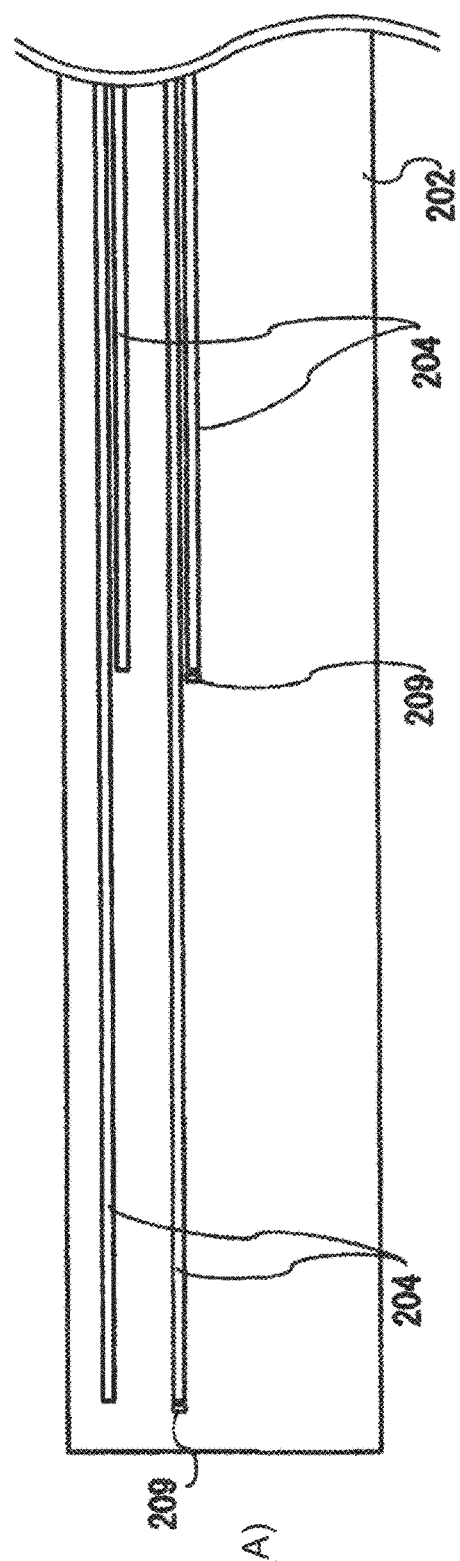
FIGS. 30A to 30C are schematic views illustrating part of the carbide producing device according to the embodiment.
Figure 30:
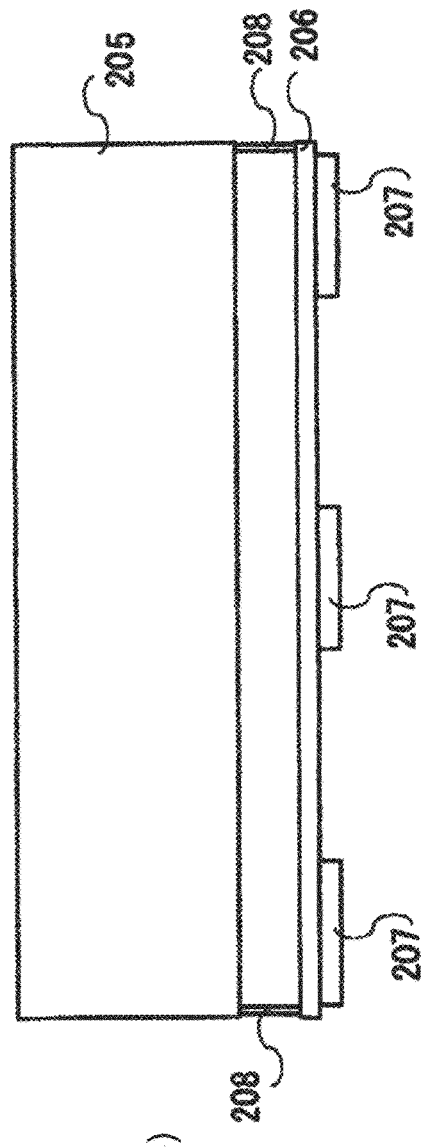
Figure 30:
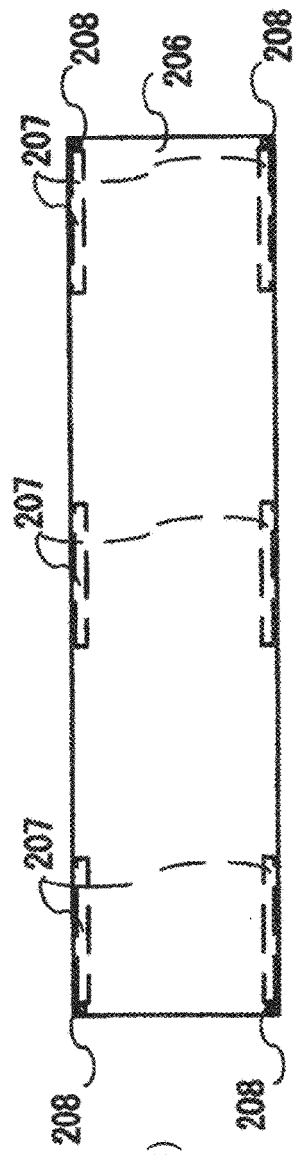

Graphene 113 purified in the purification process S2-1 to increase carbon purity is added and the conductor 150 is formed into a linear shape. FIG. 24A illustrates a linear state of the conductor 150. Since the conductor 150 itself shrinks, the conductor 150 can conduct electricity while expanding and shrinking. Therefore, the conductor expands and shrinks, and can be used as a signal line or a power line of a robot or a drive unit in which there is concern about breakage so far. FIG. 24B illustrates the cross section of the conductor 150 which is formed by mixing graphene 113.

As a rubber material 110, natural rubber, styrene rubber, butadiene rubber, chloroprene rubber, butyl rubber, nitrile rubber, ethylene-propylene rubber, chlorosulfonated polyethylene, acrylic rubber, urethane rubber, silicone rubber, fluoro rubber, hydrogenated nitrile rubber, epichlorohydrin rubber, and the like are conceivable. Note that in addition to the rubber material 110, a shrinkable resin may be used.

In the present embodiment, conductivity of the conductor 150 is improved by removing silicon from shrinkable material in the purification process S2-1 to be described later to increase the purity of graphene, that is, the proportion of carbon.

The conductor 150 illustrated in FIGS. 24A and 24B is formed by mixing graphene 113 in the rubber material 110 and mixing the rubber material 110 and graphene 113 by extrusion molding from a nozzle.

FIGS. 25A to 25F illustrate other embodiments of the conductor 150. FIG. 25A illustrates a side surface of a tape-like conductor 150, and graphene 113 is laid on a surface of a piece-like conductor 120. FIG. 25B illustrates a cross section of the piece-like conductor 120. The piece-like conductor 120 is provided with a core material 122 in the inside thereof. The piece-like conductor 120 is made of the above-described rubber material or conductive rubber material which is shrinkable.

The piece-like conductor 120 can form a shrinkable conductive wire by making graphene 113 having excellent conductivity to be bonded to or contained in the surfaces of both side surfaces of the core material 122.

FIG. 25C illustrates a conductive fabric 125 in which the piece-like conductors 120 are alternately woven into a woven fabric shape to form a plane. The conductive fabric 125 is a conductive member having shrinkability and flexibility and having a large surface area.

FIG. 25D illustrates a cross section of a linear conductor 150, and graphene 113 is laid on a surface of a shrinkable linear conductor 130. The shrinkable linear conductor 130 is provided with a linear core material 132 in the inside thereof. The linear core material 132 is made of the above-described rubber material or conductive rubber material which is shrinkable.

The shrinkable linear conductor 130 can form the shrinkable conductor 150 by making graphene 113 having excellent conductivity to be bonded to or contained in the surfaces of both side surfaces of the linear core material 132.

FIG. 25F illustrates a net-shaped conductor 135 in which a braided net is configured of the shrinkable linear conductors 130. The net-shaped conductor 135 is a conductive member having shrinkability and flexibility and having a large surface area. Note that the net-shaped conductor 135 may be used for the conductor 53 described above.

FIG. 25E illustrates a cross section of a linear conductor 150 in which the insulating rubber material 133 described above having an insulating property is provided on the shrinkable linear conductor 130 in FIG. 25D so as to cover the shrinkable linear conductor 130.

A shrinkable silicone resin or the like may be used in lieu of the rubber material 110.

Tenth Embodiment

Carbide Producing Device

With reference to FIGS. 27 to 30C, the present embodiment is a carbide producing device 200 which enables further mass production and designed based on the plasma devices 10, 100 for producing the carbide 19 described above.

The carbide producing device 200 is provided with a plurality of storage containers 205 inside a see-through quartz tube 203 in order to mainly enable mass production. The storage container 205 is made of carbon or composite material of carbon and is configured to accommodate the carbon source 9 which is a vegetable material.

First, with reference to FIGS. 27 and 28, the carbide producing device 200 will be described. The transparent columnar quartz tube 203 is provided between a left flange 231 and a right flange 232. The left and right flanges 231, 232 enable the quartz tube 203 to be sealed and opened so that the inside of the quartz tube 203 can be maintained in a vacuum state or a low pressure state. In addition, the quartz tube 203 can be detached from one of the left and right flanges 231, 232 which is opened. The left and right flanges 231, 232 have a water cooling type cooling function.

Note that the quartz tube 203 may be detached and fixed from both sides of the left and right flanges 231, 232 so as to be sandwiched by the left and right flanges 231, 232.

As illustrated in FIG. 27, the right flange 232 is connected to a pipe connected to a control valve 224 for controlling the flow rates of an inert gas 217 and a combustion gas 218. Therefore, the quartz tube 203 can be filled with the inert gas 217 or the combustion gas 218. In addition, the right flange 232 is connected to a low vacuum pressure gauge 219, and the left flange 231 is connected to a pressure control valve 222 and the control valve 224 with a filter 221 interposed therebetween.

The control device 210 controls the pressure inside the quartz tube 203 by using a dry pump 223 connected to the pressure control valve 222 and the control valve 224.

As illustrated in FIGS. 27 and 28, the carbide producing device 200 includes a high-frequency coil 240 and an electric furnace 250 so that various temperatures can be reached, not only carbon but also silica can be extracted from the carbon source 9 which is a vegetable material, and the carbide producing device 200 can also be used in the above-described purification process.

The high-frequency coil 240 is formed so as to surround the periphery of the quartz tube 203, and a coil support tool 242 for supporting a coil 243 is fixed to a driving device 1 (214). The driving device 1 (214) moves along rails 236 in the X, −X directions. A motor is used as the driving device 1 (214). Note that linear driving or the like may be used in lieu of the motor.

Although the principle and production processes of the carbide producing device 200 are the same as those of the plasma device 100 of the second embodiment described above, the carbide producing device 200 differs from the plasma device 100 in that the high-frequency coil 240 is movable in the X and −X directions. Once the high-frequency coil 240 is installed, it is possible to sequentially carbonize the plurality of storage containers 205 accommodating the carbon sources 9. Therefore, it is possible to carbonize a large amount of the carbon sources 9 at a time. Mainly, in the production processes, the high-frequency coil 240 can be utilized in the carbonization process S2 in FIG. 1 described above.

In addition, the high-frequency coil 240 is provided with a shielding plate 241 in the vicinity of the coil 243 in order to reduce the influence of electromagnetic waves emitted from the coil 243.

The carbide producing device 200 makes the inert gas 217 flow and applies a high-frequency magnetic field of 4 MHz from a high-frequency power supply 212 to the high-frequency coil 240. Therefore, as illustrated in FIG. 4, thermal plasma was generated and relatively large yields were obtained in a range from 300° C. to 1000° C. inclusive.

By using the high-frequency coil 240 and the inert gas 217 as described above, even lignin which is difficult to be thermally decomposed can be decomposed. In addition, the carbide producing device 200 is optimal for mass production since no toxic substances and the like are generated in the production processes.

Note that besides the plasma device described above, there is a method of producing thermal plasma by a plasma device using barrier discharge, corona discharge, pulse discharge, and DC discharge.

The high-frequency power supply 212 is provided with a water-cooling type cooling device 213 for cooling the coil 243 and the power supply. A filter 221 formed of a nonwoven fabric, cotton, paper, or the like is provided in order to prevent a tar component or the like generated during burning in the quartz tube 203 from affecting the dry pump 223.

In addition, in a temperature control device 211 illustrated in FIG. 27, a thermocouple 235 is provided close to each storage container 205 as illustrated in FIG. 28. Therefore, according to information obtained from the temperature control device 211, the control device 210 can perform carbonization at a desired temperature. In particular, temperature control is important because the yield changes depending on the temperature, and the carbide producing device 200 can extract not only the carbide 19 but also a large amount of silica from the vegetable material by controlling the temperature.

The electric furnace 250 is formed so as to surround the periphery of the quartz tube 203, and is fixed to a driving device 2 (216). The driving device 2 (216) moves along the rails 236 in the X, −X directions. A motor is used as the driving device 2 (216). Note that linear driving or the like may be used in lieu of the motor.

The electric furnace 250 can raise the temperature up to about 2000° C. by using heat from a heating element provided, for example, using Joule heating, and it is possible to burn the inside of the quartz tube 203 when the carbon source 9 or the carbide 19 is refined while supplying the combustion gas 218. In addition, the combustion gas 218 is used for assisting burning, and oxygen or the like is considered as the combustion gas 218. The combustion gas 218 is mainly used in a process in the purification process S2-1 illustrated in FIG. 22 and is used for burning at about 1000° C.

Note that the electric furnace 250 may be a low-frequency induction furnace utilizing electromagnetic induction current, a high-frequency induction furnace utilizing eddy current, an arc furnace utilizing high heat of arc light, or the like. In addition, the electric furnace 250 can remove as $CO_2$ the carbide attached to the quartz tube 203 which is originally transparent and clean the quartz tube 203 by supplying oxygen serving as the combustion gas 218 and burning the carbide. As a result, it is possible to prevent the temperature of thermal plasma produced by the high-frequency coil 240 from being lowered.

Next, with reference to FIGS. 28 to 30C, the quartz tube 203 and the storage container 205 will be described.

As illustrated in FIGS. 29 and 30B, the storage container 205 is formed of carbon material in a box shape with the upper end thereof opened so as to store the carbon source 9 or the carbide 19 therein. In particular, the carbide producing device 200 is provided with the plurality of storage containers 205 so that more carbon sources 9 can be carbonized than the amount of carbon source carbonized by each of the above-described plasma devices 10, 100.

The storage container 205 is fixed to a mounting table 206 including a plurality of upper end piece portions 208 which are rod-shaped projecting pieces and provided at four corners on a front surface of the mounting table 206, and a plurality of lower end piece portions 207 which has a piece shape and projects downward at both ends on the back surface of the mounting table 206. A hole into which the piece of the upper end piece portion 208 can be inserted is formed in the storage container 205, the hole being positioned at the same location as the position of the upper end piece portion 208 located below. The upper end piece portion 208 is fitted in the hole, and the storage container 205 is fixed to the mounting table 206.

The mounting table 206 to which the storage container 205 is fixed is mounted on a base 202 such that the lower end piece portions 207 are fitted into base grooves 204 which are groove provided in the base 202. A plurality of the base grooves 204 is provided such that the base grooves 204 are shifted from each other by Y1 in the width direction so that the storage containers 205 can be disposed so as to be shifted from each other. In addition, the storage containers 205 are separated not only in the width direction but also in the X direction by a predetermined distance X1 as illustrated in FIG. 28.

By separating the storage containers 205 in the Y1 direction or the X direction, it is attempted to prevent the storage container 205 other than the target of carbonization from being affected as much as possible during carbonization caused by plasma heat. In addition, in order to enable temperature control, in the base 202, a thermocouple storage space 209 which is a space in which the thermocouple can be fixed is secured in the vicinity of the base groove 204.

As illustrated in FIG. 29, the quartz tube 203 is formed in a circular tube shape made of transparent quartz and having an outer diameter of about 125 mm. In addition, the mounting table 206 is formed to have a width such that the storage container 205 can be disposed below the center of the inside of the chamber of the quartz tube 203.

Even though the carbide producing device 200 is configured to obtain carbon, it is also possible to extract silica from the biomass material depending on temperature conditions, and in particular, it is possible to produce amorphous silica. In addition, the electric furnace 250 enables not only the carbonization process S2 described above but also the purification process S2-1. Therefore, it is possible to perform various processes while controlling the temperature with the identical device.

Eleventh Embodiment

Impurity Removing Device

FIG. 31 illustrates an example of an impurity removing device 40 which removes silicon oxide (silicon) from the carbide 19 obtained by carbonizing the carbon source 9 by the above-described plasma device 10, 100 to obtain graphene 113.

In a heating furnace 41, a furnace 42 can be heated to a high temperature close to 2000° C. A large crucible 50 has a lid 51, and a small crucible 60 and activated carbon 53 are put in a vessel 52. In the small crucible 60, potassium hydroxide (KOH) 18 is mixed on the carbide 19 in a vessel 62, and a lid 61 is provided. Stable fine ceramic material or the like is considered as the material of the small crucible 60 and the large crucible 50, and aluminum oxide $Al_2O_3$ or the like is used.

Twelfth Embodiment

Method for Producing Conductor

Process Flow 2

With reference to FIG. 22, production processes for a method of producing graphene 113 using the carbide producing device 200 will be described. Note that since a pretreatment process S1 is the same as the pretreatment process S1 in the process flow 1 according to the above-described fourth embodiment, a description thereof will be omitted.

A carbonization process S2 in the case of using the carbide producing device 200 illustrated in FIGS. 27 to 30C according to the present embodiment will be described. In the pretreatment process S1, a carbon source 9 is laid in the storage container 205 and covered with a metal net made of stainless steel or the like. The plurality of storage containers 205 are arranged so as to be shifted from each other in the predetermined heating location of the carbide producing device 200 described above. The pressure inside the quartz tube 203 is reduced to 80 Pa by the dry pump 223 and the inert gas 217 is injected into the quartz tube 203 at a flow rate of 8 to 10 ml/min, and the inside of the chamber 1 is maintained at a pressure of 1300 Pa to 1500 Pa.

As illustrated in FIG. 4, the applicant performed the carbonization process S2 in a range from 200° C. to 1100° C. in an increment of 100° C. by thermal plasma, and obtained temperatures and yields when the carbon source 9 was carbonized. The value obtained by dividing the weight of the carbide 19 obtained from 0.8 g of the carbon source 9 by 0.8 g (the weight of the carbon source 9) is illustrated in FIG. 4. The highest yield of 36% was obtained in a range from 600° C. to 800° C., and relatively large yields were obtained in a range from 300° C. to 1000° C. inclusive. In this measurement, rice straw, rice bran, coconut shell, chaff, and peanut shell, and the like were used, and similar results were obtained.

Next, a purification process S2-1 will be described. Potassium hydroxide (KOH) 18 is mixed with the carbide 19 obtained as described above in a weight ratio of 5 to 1, the mixture is put in the vessel 62 of the small crucible 60 illustrated in FIG. 31, and the lid 61 is put on the small crucible 60. In addition, the small crucible 60 is accommodated in the storage container 205 illustrated in FIG. 31, and activated carbon 53 is filled around the small crucible 60. The activated carbon 53 is filled in order to prevent entry of oxygen into the small crucible 60. The electric furnace 250 heats the inside of the quartz tube 203 to a temperature close to 950° C. and firing is performed for about 2 to 3 hours.

Here, since the potassium hydroxide 18 promotes removal of silicon, the potassium hydroxide 18 is used from the viewpoint of improving the yield of graphene 113. Examples of bases are alkali metal hydroxides such as sodium hydroxide and lithium hydroxide, alkaline earth metal hydroxides such as magnesium hydroxide and calcium hydroxide, alkali metal oxides such as sodium oxide and potassium oxide, alkaline earth metal oxides such as magnesium oxide and calcium oxide, alkali metal sulfides such as sodium sulfide and potassium sulfide, and alkaline earth metal sulfides such as magnesium sulfide and calcium sulfide. It is also conceivable to remove lignin that cannot be carbonized by using one or more acids selected from the group consisting of hydrochloric acid, sulfuric acid, PTSA, and aluminum chloride.

In the carbide 19 which reacted with potassium hydroxide, silicic acid reacts with potassium hydroxide 18 to become potassium silicate, remaining water-soluble potassium hydroxide (KOH) 18 (FIG. 31) and potassium silicate are dissolved in water, filter paper is set for the liquid mixture, the liquid mixture is made to pass through a filter in a vacuum or reduce-pressure state, and thus silicon or silicon oxide is removed from the liquid mixture. In the purification process S2-1 in which drying was performed, graphene 113 which was a final product whose weight was about ⅛ to ⅒ of the weight of the vegetable material when the vegetable material was granulated at first was able to be produced.

FIG. 32 is an electron micrograph of 50,000 times magnification of graphene 113 when impurities are removed and carbon purity is increased. FIG. 33 is an electron micrograph of 100,000 times magnification of graphene 113 when impurities are removed and the carbon purity is increased. As described, since nano-level pores are formed, it is also possible to increase electric conductivity by mixing metallic substance. For example, if metal is adsorbed on graphene 113 by using metal ions such as copper ions and alumina ions, electric conductivity can be improved.

A carbon fiber production process S3 is configured of processes the same as those of S3 described above. However, regarding the carbide 19, graphene 113 subjected to the above described purification process S2-1 is used. Therefore, electrical conductivity is more excellent. A conductor 150 produced by the carbon fiber production process S3 is the conductor 150 mainly described in the eighth embodiment.

Next, as described in the eighth embodiment, in a case where the conductor is used for an electric wire such as a signal line or electrical wiring, it is also conceivable to add a process of applying coating on a single wire and a process of twisting the single wire to a conductive member production process S5. In the conductive member production process S5, in the case of using the shrinkable net-shaped conductor 135 or the conductive fabric 125 as illustrated in the ninth embodiment, a process of providing a shrinkable insulating layer on the surface of the shrinkable net-shaped conductor 135 or the conductive fabric 125 may be performed.

Note that even though graphene 113 produced from a vegetable material is used for the above-described conductor 150, carbon or a carbon nanotube produced from a mineral or petroleum-based material may be used.

In addition to the silicon-containing carbide 19 produced from a vegetable material, carbon or a carbon nanotube produced from mineral or petroleum-based material and containing silicic acid or a resin so as to raise the electric resistance value may constitute the heating element 51.

Note that the numerical value on the right end of the electron micrograph is a value obtained by summing up all the 10 graduations, and one graduation indicates one tenth of the numerical value at the right end. For example, in the case where the numerical value at the right end is 500 min, one graduation indicates 50 nm.

1 Chamber
2 Cathode
3 Anode
4, 32 High-frequency power supply
5 Crucible
6, 217 Inert gas
7 Introduction pipe
8 Lead-out pipe
9 Carbon source
10, 100 Plasma device
14, 22, 224 Control valve
15, 23 Leak valve
19 Carbide
20 Control device
21 Gas amount control device
30 Vacuum pump
31, 240 High-frequency coil
80 Combustion furnace
81 Furnace
50 Heating device
51 Heating element
52 Power supply connecting portion
53 Conductor
54 Power supply
55 Crimping portion
56 Outer Skin,
57 Connecting end portion
61, 161 Carbon fiber bundle covering portion
62, 162 Carbon fiber bundle
63 Carbon fiber
64 Base material fiber
65 Carbon
66 Silicon
67 Space portion
70 Oxidation inhibiting substance
83 Pot
91 Adhesion layer
92 Adhesion liquid
93 Solvent
94 Resin impregnated layer
95 Resin impregnated solution
110 Rubber material
113 Graphene
120 Piece-like conductor
122 Core material
125 Conductive fabric
130 Linear conductor
132 Linear core material
133 Insulating rubber material
135 Net-shaped conductor
150 Conductor
161 Carbon fiber bundle covering portion
165 Outermost periphery covering portion
180 Binding wire
185 Temporary winding wire
200 Carbide producing device
202 Base
203 Quart tube
204 Base groove
205 Storage container
206 Mounting table
207 Lower end piece portion
208 Upper end piece portion
209 Storage space
210 Control device
211 Temperature control device
212 High-frequency power supply
213 Cooling device
214 Driving device 1
215 Power supply control device
216 Driving device 2
718 Combustion gas
219 Low vacuum pressure gauge
221 Filter
223 Dry pump
231 Left flange
232 Right flange
235 Thermocouple
236 Rail
240 High-frequency coil
241 Shielding plate
242 Coil support tool
243 Coil
250 Electric furnace
S1 Pretreatment process S2 Carbonization process
S2-1 Purification process
S3 Carbon fiber production process
S4 Heating device production process
S5 Conductive member production process.

What is claimed is:

1. A heating element comprising:
   a carbide obtained by carbonizing a vegetable material containing silicon,
   carbon fibers each of which is continuous and obtained by mixing and spinning the carbide and resin;
   a carbon fiber bundle formed by bundling up the carbon fibers; and
   a heating unit configured to store the carbon fiber bundle in a tube having flexibility,
   wherein the carbide contains silicon in a weight ratio of 18 wt % to 35 wt %.

2. A heating device comprising:
   the heating element according to claim 1;
   a conductor which has a net shape and covers a periphery of the heating element;
   the conductor being electrically connected to the carbon fiber bundle with a connecting tool at one end of the heating element;
   an outer skin which has flexibility, thermal conductivity and an insulating property and covers a periphery of the conductor; and
   a power supply terminal which is provided at another end of the heating element and configured to supply power.

3. The heating device according to claim 2, wherein an air layer is provided in addition to the conductor between the tube and the outer skin.

4. A method for producing the heating element of claim 1 comprising:
   a pretreatment process of drying and pulverizing a vegetable material to obtain a carbon source;
   a carbonization process of carbonizing the carbon source to obtain a carbide, the carbonization process including a heating process of supplying an inert gas into a chamber and heating the carbon source in the chamber in a plasma atmosphere;
   a carbon fiber production process of mixing the carbide containing silicon with resin, dissolving a mixture of the carbide and the resin into a solvent to obtain carbon fibers each of which is continuous and discharged from a nozzle; and
   a tube storing process of storing the carbon fibers bundled up in an outer skin having flexibility, thermal conductivity, and an insulating property.

5. A method for producing the heating element of claim 1 comprising:
   a pretreatment process of drying and pulverizing a vegetable material containing silicon to obtain a carbon source;
   a carbonization process of carbonizing the carbon source to obtain a carbide, the carbonization process including a heating process of supplying an inert gas into a chamber and heating the carbon source in the chamber in a plasma atmosphere;
   a carbon fiber production process of obtaining carbon fibers each of which is produced by making the carbide containing silicon adhere to a surface of a base material of a single fiber; and
   a tube storing process of storing the carbon fibers bundled up in an outer skin having flexibility, thermal conductivity, and an insulating property.

* * * * *